(12) United States Patent
Iwaki et al.

(10) Patent No.: US 7,900,735 B2
(45) Date of Patent: Mar. 8, 2011

(54) HYDROSTATIC TRANSAXLE

(75) Inventors: Koji Iwaki, Hyogo (JP); Norihiro Ishii, Hyogo (JP); Fumitoshi Ishino, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 12/714,710

(22) Filed: Mar. 1, 2010

(65) Prior Publication Data
US 2010/0147616 A1    Jun. 17, 2010

Related U.S. Application Data

(63) Continuation of application No. 11/737,076, filed on Apr. 18, 2007, now Pat. No. 7,690,470.

(30) Foreign Application Priority Data

Apr. 19, 2006 (JP) ................................ 2006-116108

(51) Int. Cl.
*B60K 17/30* (2006.01)
(52) U.S. Cl. ......... 180/253; 180/252; 180/234; 180/233; 180/242
(58) Field of Classification Search .................. 180/253, 180/252, 234, 233, 242
See application file for complete search history.

(56) References Cited

U.S. PATENT DOCUMENTS

| | | | |
|---|---|---|---|
| 4,613,009 A * | 9/1986 | Nakamura et al. | 180/253 |
| 6,135,231 A | 10/2000 | Reed | |
| 6,189,641 B1 | 2/2001 | Azuma | |
| 6,202,781 B1 * | 3/2001 | Ima | 180/252 |
| 6,237,708 B1 | 5/2001 | Kawada | |
| 6,471,224 B1 * | 10/2002 | Ziech | 280/93.512 |
| 6,926,111 B1 * | 8/2005 | Irikura | 180/234 |

(Continued)

FOREIGN PATENT DOCUMENTS

DE         195 26 453 C1    11/1996

(Continued)

OTHER PUBLICATIONS

European Search Report, Application No. EP 07 10 6242, dated Aug. 19, 2008.

*Primary Examiner* — Lesley Morris
*Assistant Examiner* — Marlon A Arce
(74) *Attorney, Agent, or Firm* — Sterne, Kessler, Goldstein & Fox P.L.L.C.

(57) ABSTRACT

A hydrostatic transaxle comprises: a motor casing; at least one hydraulic motor disposed in the motor casing; at least one output shaft disposed in the motor casing so as to be driven by the at least one hydraulic motor; and a pair of steerable wheel support units attached onto respective opposite ends of the motor casing. Each of the steerable wheel support units includes an axle, a steerable casing, a wheel, and a steering arm. In each of the steerable wheel support units, the axle is drivingly connected to the at least one output shaft, the steerable casing is substantially horizontally rotatable relative to the motor casing, the wheel is attached on an outer end of the axle outside of the steerable casing, and the steering arm is rotatably integrally provided on the steerable casing. The hydrostatic transaxle further comprises a pair of connection rods for connecting the steering arms of the steerable wheel support units to a common rotary member of a steering operation mechanism spaced forward or rearward from the hydrostatic transaxle.

2 Claims, 17 Drawing Sheets

U.S. PATENT DOCUMENTS

| | | | |
|---|---|---|---|
| 6,964,310 B2 | 11/2005 | Hasegawa | |
| 7,044,244 B2 * | 5/2006 | Irikura | 180/6.26 |
| 7,431,122 B2 * | 10/2008 | Iwaki et al. | 180/305 |
| 7,487,983 B2 * | 2/2009 | LeBlanc et al. | 280/93.51 |
| 7,591,338 B2 * | 9/2009 | Irikura | 180/242 |
| 2005/0070390 A1 | 3/2005 | Irikura et al. | |
| 2006/0042839 A1 | 3/2006 | Iwaki et al. | |
| 2007/0284173 A1 * | 12/2007 | Irikura | 180/253 |
| 2007/0289798 A1 * | 12/2007 | Kaufmann | 180/253 |

FOREIGN PATENT DOCUMENTS

| | | |
|---|---|---|
| JP | 10-211883 | 8/1998 |
| JP | 2005-035402 | 2/2008 |

* cited by examiner

HYDROSTATIC TRANSAXLE

CROSS REFERENCE TO RELATED APPLICATIONS

This application is a continuation of U.S. patent application Ser. No. 11/737,076, filed on Apr. 18, 2007, which is hereby incorporated by reference in its entirety.

BACKGROUND OF THE INVENTION

1. Field of the Invention

The invention relates to a hydrostatic transaxle including a motor casing incorporating a hydraulic motor for driving an axle drivingly connected to a pair of left and right steerable drive wheels, and a pair of steerable wheel support units attached onto opposite outer ends of the motor casing so as to steerably (i.e., horizontally rotatably) support the respective steerable drive wheels. Particularly, the invention relates to a structure of the hydrostatic transaxle adapted to a steering operation mechanism for turning the steerable drive wheels.

2. Related Art

There is a well-known conventional hydrostatic transaxle including a motor casing incorporating a hydraulic motor for driving an axle drivingly connected to a pair of left and right steerable drive wheels, wherein a pair of left and right steerable wheel support units are attached onto opposite outer ends of the motor casing so as to steerably support the respective steerable drive wheels. In each of the steerable wheel support units, a steerable casing supporting each of the steerable drive wheels is steerably (i.e., horizontally rotatably) connected to the motor casing. The hydrostatic transaxle is provided with a steering linkage including a simple tie rod connecting the steerable casings to each other for steering the left and right steerable drive wheels. Such a conventional hydrostatic transaxle is provided for various four-wheel drive working vehicles, e.g., an agriculture tractor, a riding lawn mower and construction machinery.

In the above-mentioned conventional hydrostatic transaxle, the tie rod requires a considerably large space (hereinafter, the space is referred to as "tie-rod arrangement space") near the hydrostatic transaxle so as to be spanned between the left and right steerable casings, so that a space for arranging another member or device near the hydrostatic transaxle may be narrowed depending on where the tie rod is disposed.

JP 2005-35402A, for example, supposes the tie rod to be disposed (on the fore-and-aft proximate side of the hydrostatic transaxle) opposite to a pressure fluid pipe (on the fore-and-aft distal side of the hydrostatic transaxle) with respect to the hydrostatic transaxle so as to prevent the tie rod from interfering with the pressure fluid pipe. However, the tie rod still requires a laterally long tie-rod arrangement space near the hydrostatic transaxle so as to space other members and devices, such as another pressure fluid pipe (for supplying fluid to the hydraulic motor or for lubricating the hydrostatic transaxle) and/or a mechanical power transmission component (e.g., a propeller shaft), from the hydrostatic transaxle into the outside of the tie-rod arrangement space. That is, these members and devices surrounding the hydrostatic transaxle cannot be compactly arranged near the hydrostatic transaxle, thereby resulting in complex piping or mechanism, increased components and costs, inconvenience for assembly and maintenance, etc.

BRIEF SUMMARY OF THE INVENTION

According to the invention, a hydrostatic transaxle comprises: a motor casing; at least one hydraulic motor disposed in the motor casing; at least one output shaft disposed in the motor casing so as to be driven by the at least one hydraulic motor; and a pair of steerable wheel support units attached onto respective opposite ends of the motor casing. Each of the steerable wheel support units includes an axle, a steerable casing, a wheel, and a steering arm. In each of the steerable wheel support units, the axle is drivingly connected to the at least one output shaft, the steerable casing is substantially horizontally rotatable relative to the motor casing, the wheel is attached on an outer end of the axle outside of the steerable casing, and the steering arm is rotatably integrally provided on the steerable casing. The hydrostatic transaxle further comprises a pair of connection rods for connecting the steering arms of the steerable wheel support units to a common rotary member of a steering operation mechanism spaced forward or rearward from the hydrostatic transaxle.

Therefore, in comparison with the tie rod provided to the conventional hydrostatic transaxle, the pair of connection rods are easily extended forward or rearward from the steering arms so that utmost ends of the respective connection rods can be spaced forward or rearward from the hydrostatic transaxle so as to be connected to the common rotary member of the steering operation mechanism. Consequently, a sufficiently large space near the hydrostatic transaxle outside of the tie-rod arrangement space can be ensured so as to compactly and simply arrange other components near the hydraulic transaxle, thereby reducing the components in number and cost, and facilitating assembly and maintenance.

Preferably, the hydrostatic transaxle according to the invention comprises: a pair of hydraulic motors and a pair of output shafts. The pair of hydraulic motors includes the at least one hydraulic motor, and the pair of output shafts includes the at least one output shaft. The pair of hydraulic motors are disposed in the motor casing, and the pair of output shafts are disposed in the motor casing so as to be driven by the respective hydraulic motors and to be drivingly connected to the respective axles.

In this regard, the two-motor type hydrostatic transaxle, including the pair of hydraulic motors, advantageously drives the respective left and right axles individually so as to have excellent turnability and traveling performance. While this effect is obtained, the above-mentioned large space near the hydrostatic transaxle obtained by the arrangement of the pair of connection rods can advantageously involve several components required for constituting the two-motor type hydrostatic transaxle.

Further preferably, with respect to the two-motor type hydrostatic transaxle, at least one of the pair of hydraulic motors has a variable displacement, and is associated with one of the wheels so that the variable displacement of the at least one of the hydraulic motors is changed according to variation of a turn angle of one of the wheels.

Therefore, during turn of a vehicle equipped with the hydrostatic transaxle, the steerable drive wheels supported by the steerable wheel support units of the hydrostatic transaxle have a different rotary speed from that of unsteerable drive wheels of the vehicle, thereby preventing dragging of the steerable drive wheels or the unsteerable drive wheels.

Preferably, the motor casing and the pair of steerable wheel support units are arranged in a gate-shape in a front or rear view by offsetting the axles downward from the at least one output shaft. Therefore, a power transmission component (e.g., a pressure fluid pipe and/or a propeller shaft) and/or other components can be simply and inexpensively disposed in a sufficiently large space ensured below the motor casing between the steerable wheel support units so as to be prevented from interfering with the connection rods and components of the steering operation mechanism. Further, the gate-shape of the hydrostatic transaxle ensures a large ground clearance advantageously for traveling of an agriculture tractor over a ridge, for instance.

Preferably, the motor casing includes a portion supported by a frame of a vehicle frame rotatably centered on an axis extended in the fore-and-aft direction of the vehicle. Therefore, the hydraulic transaxle is supported by a vehicle body rotatably so as to ensure suspensions for the wheels supported by the transaxle.

Preferably, the steering arms of the respective steerable wheel support units include respective portions to which a pair of connection rods are connected, and wherein the pair of connection rods are extended and connected to the common rotary member of the steerable operation mechanism so as to be arranged in a V-shape. Therefore, the common rotary member is effectively spaced from the hydraulic transaxle so as to ensure a large space surrounded by the connection rods and the rotary member in front or rear of the transaxle, thereby facilitating arrangement of various components.

These, other and further objects, features and advantages will appear more fully from the following description with reference to accompanying drawings.

BRIEF DESCRIPTION OF THE DRAWINGS/FIGURES

DETAILED DESCRIPTION OF THE INVENTION

Figure 1:
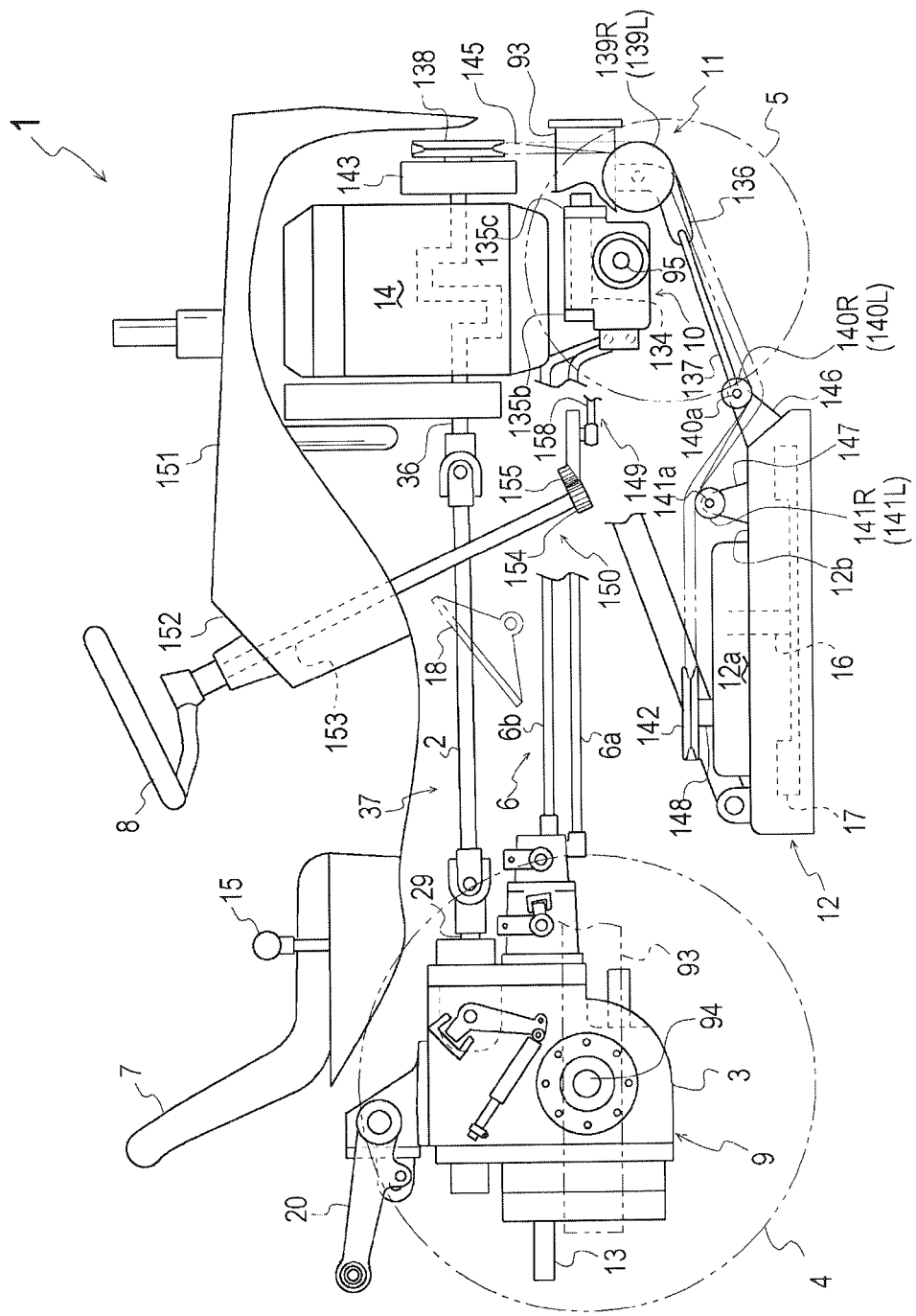
FIG. 1 is a side view partly in section of a working vehicle equipped with a hydrostatic transaxle according to the invention, serving as a front transaxle.

Referring to FIG. 1, description will be given of a general configuration of a working vehicle 1 serving as an embodiment of a working vehicle equipped with a hydrostatic transaxle of the invention. Working vehicle 1 includes a vehicle frame 93. An engine 14 is mounted on a front portion of vehicle frame 93, and a rear transaxle 9 including a casing 3 is supported by a rear portion of vehicle frame 93 between left and right rear unsteerable drive wheels 4. A power transmission linkage 37 is interposed between engine 14 and rear transaxle 9. In power transmission linkage 37, a propeller shaft 2 is interposed between a horizontal rearward projecting engine output shaft 36 of engine 14 and a horizontal forward projecting input shaft 29 of rear transaxle 9 through universal joints, preferably, so as to transmit power from engine 14 to rear transaxle 9. A front transaxle 10 is supported by the front portion of vehicle frame 93 below engine 14 so as to turn and drive left and right front steerable drive wheels 5. A fluid connection piping 6 is interposed between front transaxle 10 and rear transaxle 9 so as to supply fluid in casing 3 of rear transaxle 9 to front transaxle 10.

In working vehicle 1, a steering operation mechanism 150 including a steering wheel 8 for turning front wheels 5 is disposed behind a bonnet 151 enclosing engine 14. A driver's seat 7 is disposed behind steering operation mechanism 150. A sub-speed control lever 15 is disposed beside seat 7. A mid-mount mower 12 is disposed between front wheels 5 and rear wheels 4 below vehicle frame 93. To drive rotary blades 17 of mower 12, a later-discussed mower-driving transmission system 11 transmits power from engine 14 into a gearbox 12a of mower 12 so as to drive a drive shaft 16 of rotary blades 17. As drawn in phantom lines in FIG. 1, a main-speed control pedal 18 is disposed at a fore-and-aft middle portion of working vehicle 1 so as to determine the traveling speed and direction of working vehicle 1.

A rear-mount working machine, such as a rotary cultivator, can be connected to a rear end of working vehicle 1. A power takeoff ("PTO") shaft 13 projects rearward from rear transaxle 9 so as to drive the rear-mount working machine. Left and right lift arms 20 are pivoted on a top of casing 3 of rear transaxle 9 so as to be vertically rotated by telescopic actuation of a hydraulic lift cylinder 19 (see FIG. 11) attached on rear transaxle 9, thereby raising and lowering the rear-mount working machine.

Figure 11:
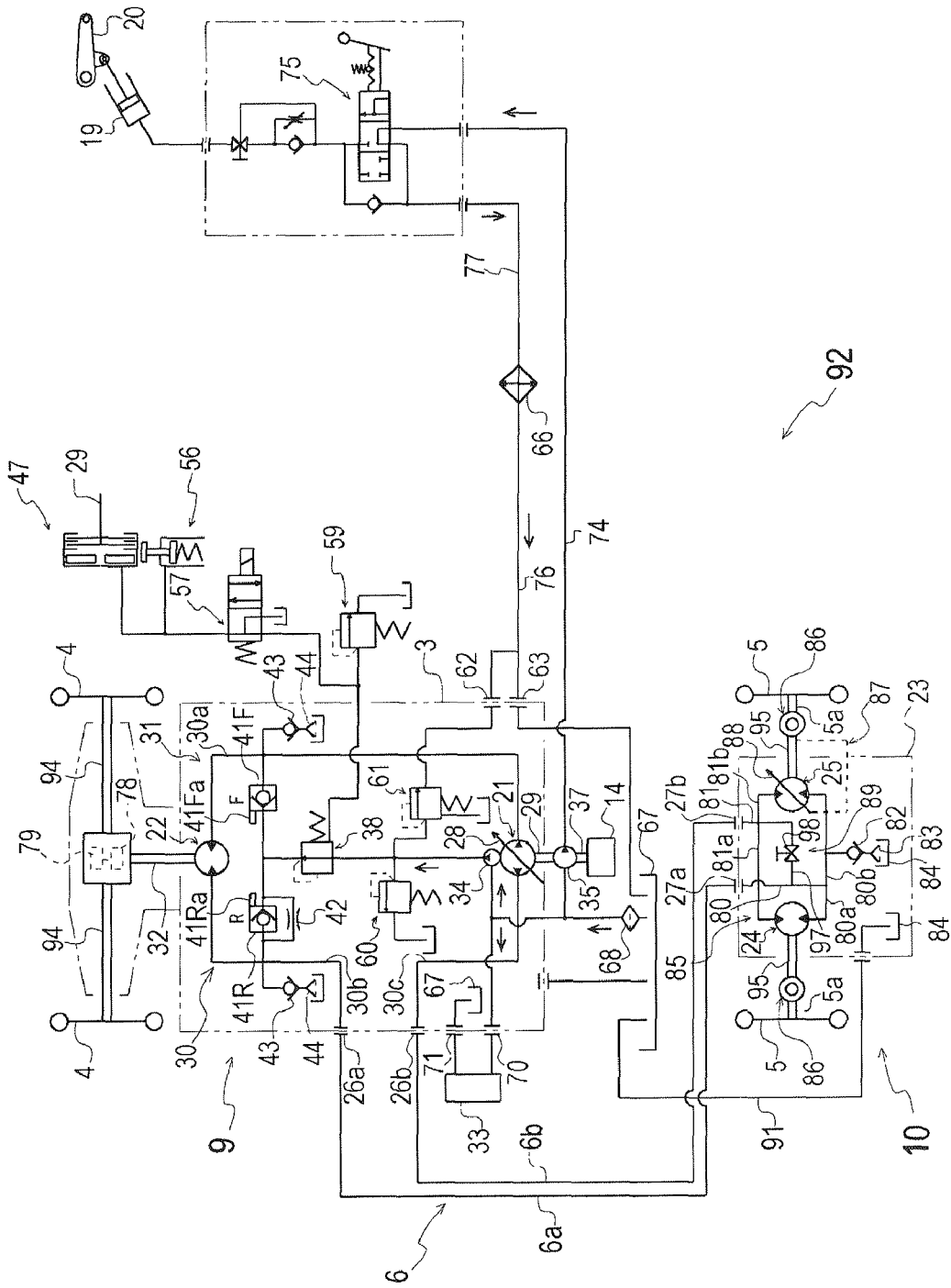
FIG. 11 is a hydraulic circuit diagram for the working vehicle.

Referring to FIGS. 1 and 11, a hydraulic circuit 92 of working vehicle 1 will be described. Casing 3 of rear transaxle 9 incorporates a hydraulic pump 21, and a hydraulic motor 22 for driving left and right rear wheels 4. A casing 23 of front transaxle 10 incorporates a pair of hydraulic motors 24 and 25 for respective left and right front wheels 5.

In rear transaxle 9, hydraulic pump 21 has a variable displacement, and hydraulic motor 22 has a fixed displacement. A main fluid passage unit 30, including passages 30a, 30b and 30c, is disposed in rear transaxle 9 so as to serve as a part of a closed fluid circuit among hydraulic pump 21, hydraulic motor 22 and the pair of hydraulic motors 24 and 25. Passage 30a directly connects hydraulic pump 21 and motor 22 to each other so as to be higher-pressurized for forward traveling of working vehicle 1. In other words, when working vehicle 1 travels forward, hydraulic pump 21 supplies fluid to hydraulic motor 22 prior to the pair of hydraulic motors 24 and 25. On the contrary, when working vehicle 1 travels backward, hydraulic pump 21 supplies fluid to the pair of hydraulic motors 24 and 25 prior to hydraulic motor 22.

In this regard, a pair of ports 26a and 26b are provided on casing 3 of rear transaxle 9. Passage 30b from hydraulic motor 22 is connected to port 26a in casing 3, and passage 30c from hydraulic pump 21 is connected to port 26b in casing 3. A pair of ports 27a and 27b are provided on casing 23 of front transaxle 10, and fluidly connected to each other in casing 23 through the pair of hydraulic motors 24 and 25. Fluid connection piping 6 includes a pair of pressure fluid pipes 6a and 6b. Pressure fluid pipe 6a is interposed between ports 26a and 27a, and pressure fluid pipe 6b is interposed between ports 26b and 27b.

Main-speed control pedal 18 is operatively connected to a movable swash plate 28 of hydraulic pump 21 so that, due to the depression angle and direction of main-speed control pedal 18, the tilt angle and direction of movable swash plate 28 is controlled so as to determine the fluid delivery amount and direction of hydraulic pump 21, thereby determining the rotary speed and direction of hydraulic motor 22, i.e., rear wheels 4, and the pair of hydraulic motors 24 and 25, i.e., front wheels 5. In this way, the traveling speed and direction of working vehicle 1 is determined according to the depression operation of main-speed control pedal 18.

In rear transaxle 9, an output shaft (motor shaft) 32 of hydraulic motor 22 is drivingly connected to left and right rear wheel axles 94 through a deceleration gear train 78 and a differential gear unit 79. Left and right rear wheels 4 are fixed on outer ends of respective axles 94.

Input shaft 29 of rear transaxle 9 receives power from engine 14 to drive hydraulic pump 21. A charge pump 34 and an auxiliary pump 35 are coaxially and drivingly connected to input shaft 29 so as to be driven together with hydraulic pump 21. For example, a circumscribed gear pump or a trochoidal pump serves as each of charge pump 34 and auxiliary pump 35.

In rear transaxle 9, a charge check valve 41F is fluidly connected to passage 30a to be higher-pressurized for forward traveling, and a charge check valve 41R is connected to passage 30b to be higher-pressurized for backward traveling. Charge check valve 41F is opened when passage 30a is hydraulically depressed. Charge check valve 41R is opened when passage 30b is hydraulically depressed. Charge pump 34 is fluidly connected to the pair of charge check valves 41F and 41R through a reducing valve 38, so as to supply fluid to either hydraulically depressed passage 30a or 30b through corresponding opened charge check valve 41F or 41R. A relief valve 60 regulates pressure of fluid supplied from charge pump 34 to reducing valve 38.

Charge check valve 41R is provided with an orifice (neutral valve) 42 bypassing charge check valve 41R, so as to expand a neutral zone of hydraulic pump 21. Charge check valves 41F and 41R are provided with respective pushpins 41Fa and 41Ra. When working vehicle 1 is towed, pushpins 41Fa and 41Ra are simultaneously pushed so as to open both of charge check valves 41F and 41R, thereby draining fluid from passages 30a and 30b so as to allow wheels 4 and 5 to rotate without resistance of hydraulic pressure of fluid in the closed fluid circuit among hydraulic pump 21 and motors 22, 24 and 25.

Further, each of passages 30a and 30b is provided with a check valve 43 for supplying fluid through a filter 44 from a fluid sump 67 in casing 3 (in FIG. 11, fluid sump 67 appears to be disposed outside of casing 3 for convenience) to corresponding passage 30a or 30b, so as to compensate for fluid leak that may happen when working vehicle 1 is placed on a slope and engine 14 for driving charge pump 34 is stopped.

Charge pump 34 sucks fluid from fluid sump 67 in casing 3 through a fluid filter 68. Alternatively, a reservoir tank serving as a fluid source for charge pump 34 can be disposed outside of casing 3.

Lift cylinder 19 for rotating lift arms 20 attached on rear transaxle 9 is supplied with fluid delivered from auxiliary pump 35 through a fluid passage 74 and a lift control valve 75. Fluid drained from lift control valve 75 is returned to fluid sump 67 in casing 3 of rear transaxle 9 through a fluid passage 77, a fluid cooler 66, a fluid passage 76 and a port 63 provided on casing 3.

Referring to FIG. 1, working vehicle 1 is provided with later-discussed mechanical steering operation mechanism 150 including gears, i.e., a pinion 154 and a sector gear 155. Referring to hydraulic circuit 92 shown in FIG. 11, A fluid extraction port 62 is provided on casing 3 so as to supply fluid from casing 3 of rear transaxle 9 to one or more later-discussed external hydraulic implements. A fluid returning port 63 is also provided on casing 3 so as to return fluid drained from the external hydraulic implement. A part of fluid flow from charge pump 34 to reducing valve 38 is branched to port 62 through a resisting valve 61. When there is no external implement requiring the fluid extracted from port 62, a fluid passage, such as a pipe, extended from port 62 is joined to drain fluid passage 77 from lift control valve 75 so as to be returned to fluid sump 67 (preferably in casing 3).

A pair of ports 70 and 71 in addition to ports 62 and 63 are provided on casing 3 of rear transaxle 9, and connected to an external hydraulic device 33 (e.g., a working machine) disposed outside of casing 3. In rear transaxle 9, fluid supplied to hydraulic device 33 through port 70 is branched from the fluid flow from fluid sump 67 to charge pump 34. Fluid drained from hydraulic device 33 is returned to fluid sump 67 through port 71.

In rear transaxle 9, input shaft 29 is extended and provided thereon with a hydraulic PTO clutch (e.g., a wet multi-disc clutch) 47. For example, PTO shaft 13 is drivingly connected to the downstream side of PTO clutch 47. PTO clutch 47 can be supplied with fluid branched from reducing valve 38 through a PTO clutch valve (e.g., an electromagnetic valve) 57. PTO clutch 47 is provided with a PTO brake 56 which can be supplied with fluid branched from the fluid flow from PTO clutch valve 57 to PTO clutch 47. A relief valve 59 regulates pressure of fluid flow from reducing valve 38 to PTO clutch valve 57.

When PTO clutch valve 57 is disposed at a clutch-on position (as shown in FIG. 11), fluid is drained from PTO clutch 47 and PTO brake 56, so as to engage PTO clutch 47, and to simultaneously separate PTO brake 56 from PTO clutch 47, thereby allowing engaged PTO clutch 47 to rotate together with input shaft 29 and PTO shaft 13. When PTO clutch valve 57 is disposed at a clutch-off position, fluid is supplied to PTO clutch 47 and PTO brake 56, so as to disengage PTO clutch 47, and to simultaneously press PTO brake 56 against PTO clutch 47, thereby preventing PTO shaft 13 with disengaged PTO clutch 47 from inertially rotating.

Referring to FIG. 11, a hydraulic system of hydrostatic transaxle 10, serving as front transaxle 10 in working vehicle 1, will be described. Hydraulic motor 24 has a fixed displacement, and hydraulic motor 25 has a variable displacement. In casing 23 of front transaxle 10, a passage 80 is extended from port 27a, and is bifurcated into passages 80a and 80b connected to respective hydraulic motors 24 and 25. Further, in casing 23, a passage 81 is extended from port 27b, and is bifurcated into passages 81a and 81b connected to respective hydraulic motors 24 and 25. In this way, passages 80, 80a, 80b, 81, 81a, 81b constitute a parallel-motor fluid passage unit 85 so as to distribute fluid from rear transaxle 9 through one of external pipes 6a and 6b to parallel hydraulic motors 24 and 25, and to drain fluid from parallel hydraulic motors 24 and 25 to rear transaxle 9 through the other of external pipes 6a and 6b.

In this way, main passage unit 30 (i.e., passages 30a, 30b and 30c) in rear transaxle 9 and parallel-motor fluid passage unit 85 (i.e., passages 80, 80a, 80b, 81, 81a and 81b) in front transaxle 10 are connected to each other through piping 6 (i.e., pipes 6a and 6b), so as to constitute the closed fluid circuit among hydraulic pump 21, hydraulic motor 22 and the pair of hydraulic motors 24 and 25 for four-wheel driving of working vehicle 1 with rear wheels 4 and front wheels 5.

Due to this closed fluid circuit, the pair of hydraulic motors 24 and 25 are fluidly connected in parallel to hydraulic pump 21 so as to differentially drive front wheels 5 for smooth turning front wheels 5. Left and right front wheels 5 have respective axles 5a which are drivingly and steerably connected to output shafts (more specifically, motor shafts 105 and transmission shafts 96 drivingly connected to respective motor shafts 105 serve as the output shafts) of respective hydraulic motors 24 and 25 through respective left and right steerable wheel support units 86. Left and right steerable wheel support units 86 are operatively connected to steering wheel 8 through steering operation mechanism 150, so as to be turned by rotating steering wheel 8, thereby turning front wheels 5.

As mentioned above, only hydraulic motor 25 has a variable displacement. Here, if the variable displacement of hydraulic motor 25 is reduced while the total fluid flow from hydraulic pump 21 is kept constant, fluid flow through the other hydraulic motor 24 is increased, thereby resulting in that the output rotations of hydraulic motors 24 and 25 are substantially evenly accelerated. Therefore, a movable swash plate 88 of hydraulic motor 25 is operatively connected to one of left and right steerable wheel support units 86 (preferably, on the same side with hydraulic motor 25) through a swash plate control linkage 87, so that, when working vehicle 1 turns, movable swash plate 88 is controlled to reduce the displacement of hydraulic motor 25, so as to substantially evenly accelerate left and right front wheels 5, thereby preventing front wheels 5 from being dragged following rotation of rear wheels 4.

Incidentally, the above-mentioned acceleration of front wheels 5 during turning of working vehicle 1 is liable to cause hydraulic motors 24 and 25 to receive backflowing driving power from front wheels 5 so as to act as pumps and to hydraulically depress their suction ports, thereby resulting in cavitation in hydraulic circuit 92 and hurting travel of working vehicle 1. Therefore, in front transaxle 10, a check valve 82 is connected to one passage of parallel-motor fluid passage unit 85 so as to supply fluid to the passage from a fluid sump 84 in casing 23 through a fluid filter 83. Preferably, passage 80b, which serves as a suction port of variable displacement hydraulic motor 25 during forward travel of working vehicle 1, is selected as the passage connected to check valve 82 so as to be efficiently compensated for its hydraulic depression.

Incidentally, preferably, working vehicle 1 is set so that the peripheral speed of rear wheels 4 is higher than that of front wheels 5 during straight travel of working vehicle 1, because, if rear wheels 4 and front wheels 5 were set to have equal peripheral speeds during straight travel of working vehicle 1, rotation of front wheels 5 following rear wheels 4 and rotation of rear wheels 4 following front wheels 5 would be generated one after the other another, so that working vehicle 1 would travel in a sense of instability. Due to the above setting, during straight travel of working vehicle 1, front wheels 5 normally rotate following rear wheels 4. Even if rear wheels 4 are slowed down relative to the set output speed of hydraulic motor 22, the main case is that front wheels 5 still rotate following rear wheels 4, or front wheels 5 and rear wheels 4 rotate at equal peripheral speeds. In case that the peripheral speed of front wheels 5 exceeds that of rear wheels 4, the differential peripheral speed is too small to hinder working vehicle 1 from smoothly traveling.

In front transaxle 10, a later-discussed bypass system 89 is interposed between passages 80 and 81 so as to bypass hydraulic motors 24 and 25. When working vehicle 1 is towed, bypass system 89 is operated to pass fluid from the higher-pressurized part to the lower-pressurized part in parallel-motor fluid passage unit 85 in addition to the draining of fluid from passages 30a and 30b by operating pushpins 41Fa and 41Ra, thereby further effectively allowing front and rear wheels 4 and 5 to rotate freely from the hydraulic pressure in hydraulic circuit 92.

Incidentally, a pipe or another member serves as an external passage 91 interposed between fluid sump 67 in casing 3 of rear transaxle 9 and fluid sump 84 in front transaxle 10, so as to balance the fluid supply between fluid sumps 67 and 84.

Referring to FIGS. 2 to 11, front transaxle 10 will be described. Firstly, a casing structure of front transaxle 10 will be described with reference to FIGS. 2 to 6. Casing 23 of front transaxle 10 includes a motor casing 101 and left and right axial side casings 100 detachably fixed onto left and right ends of motor casing 101. A spacer may be interposed between motor casing 101 and axial side casing 100 if a tread, i.e., a distance between left and right front wheels 5, has to be large.

Figure 5:
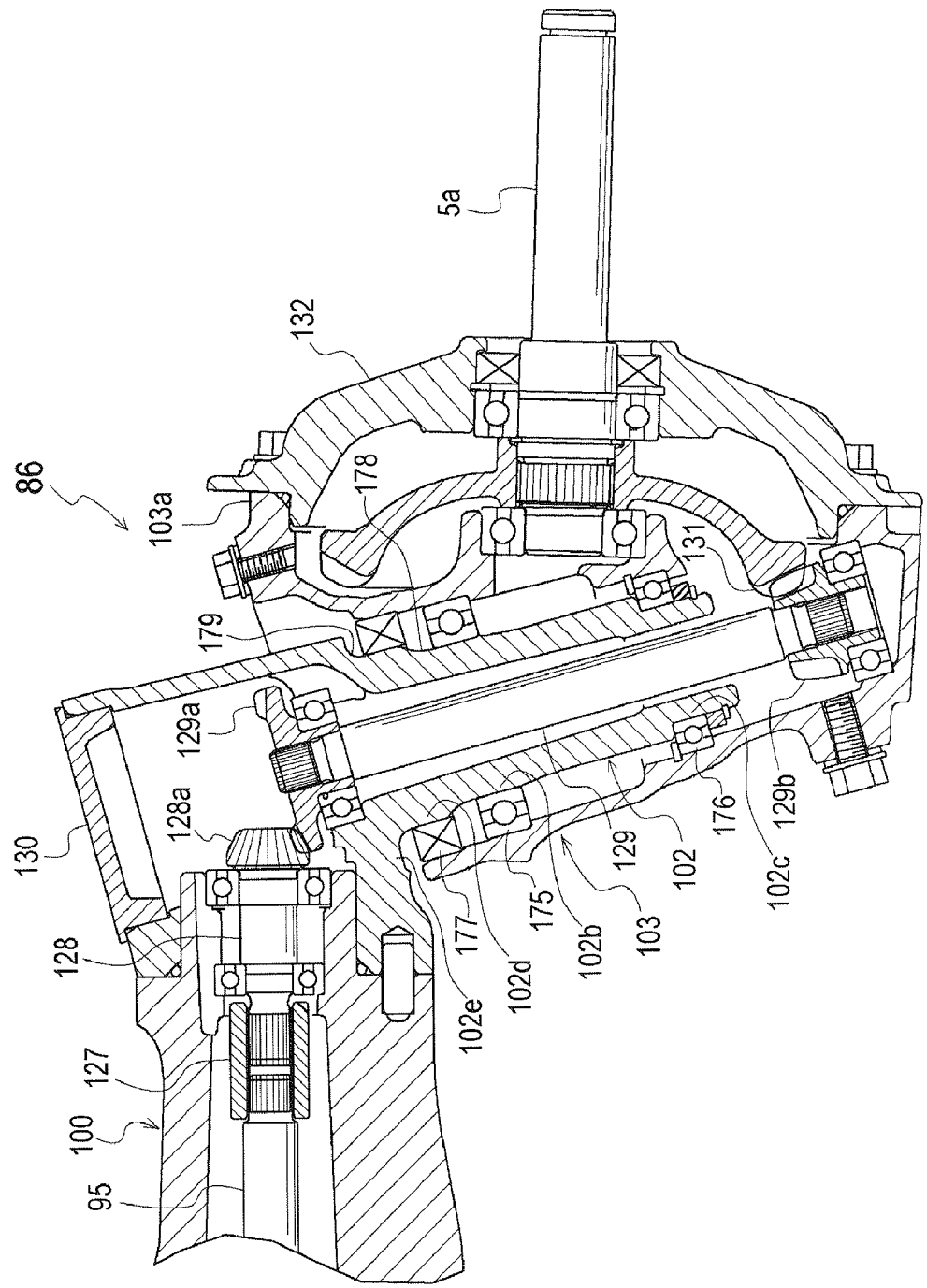
FIG. 5 is a sectional rear view of a steerable wheel support unit of the hydrostatic transaxle.

Left and right steerable wheel support units 86 are attached onto laterally distal ends of respective left and right axial side casings 100, as best shown in FIG. 5 (illustrating only representative right steerable wheel support unit 86). Each of steerable wheel support units 86 includes a kingpin casing 102 and a steerable casing 103. Each kingpin casing 102 is fixed onto the laterally distal end of each axial side casing 100. Each kingpin casing 102 is extended downward and slightly laterally slantwise at a kingpin angle, so as to be fitted into upwardly opened steerable casing 103 through upper and lower bearings 175 and 176, so that steerable casings 103 are substantially horizontally rotatable centered on respective kingpin casings 102. A seal 177 is fitted on each kingpin casing 102 so as to close the upward opening of corresponding steerable casing 103.

The downward extended portion of kingpin casing 102 includes a bottom portion 102c fitting lower bearing 176, a middle portion 102b fitting upper bearing 175, and an upper portion 102d fitting seal 177. Middle portion 102b is diametrically larger than bottom portion 102c, and upper portion 102d is diametrically larger than middle portion 102b. In other words, the downward extended portion of kingpin casing 102 is gradually diametrically expanded as it goes upward. The upper portion of kingpin casing 102 above the downward extended portion includes a substantially horizontal bottom portion 102e which is extended from the top of upper portion 102d of the downward extended portion of kingpin casing 102 so as to be joined to axial side casing 100. A junction portion between portions 102e and 102d in kingpin casing 102 is gently curved so as to be prevented from being cracked by concentrated stress.

Motor casing 101 has an opening at its rear end, and a motor cover 104 assembled with hydraulic motors 24 and 25 is detachably fixed to the rear end of motor casing 101 so as to cover the rear opening of motor casing 101, as shown in FIGS. 2, 3, 6, 8 and 9. Motor cover 104 can be easily removed together with hydraulic motors 24 and 25 from motor casing 101 so as to facilitate maintenance.

Figure 6:
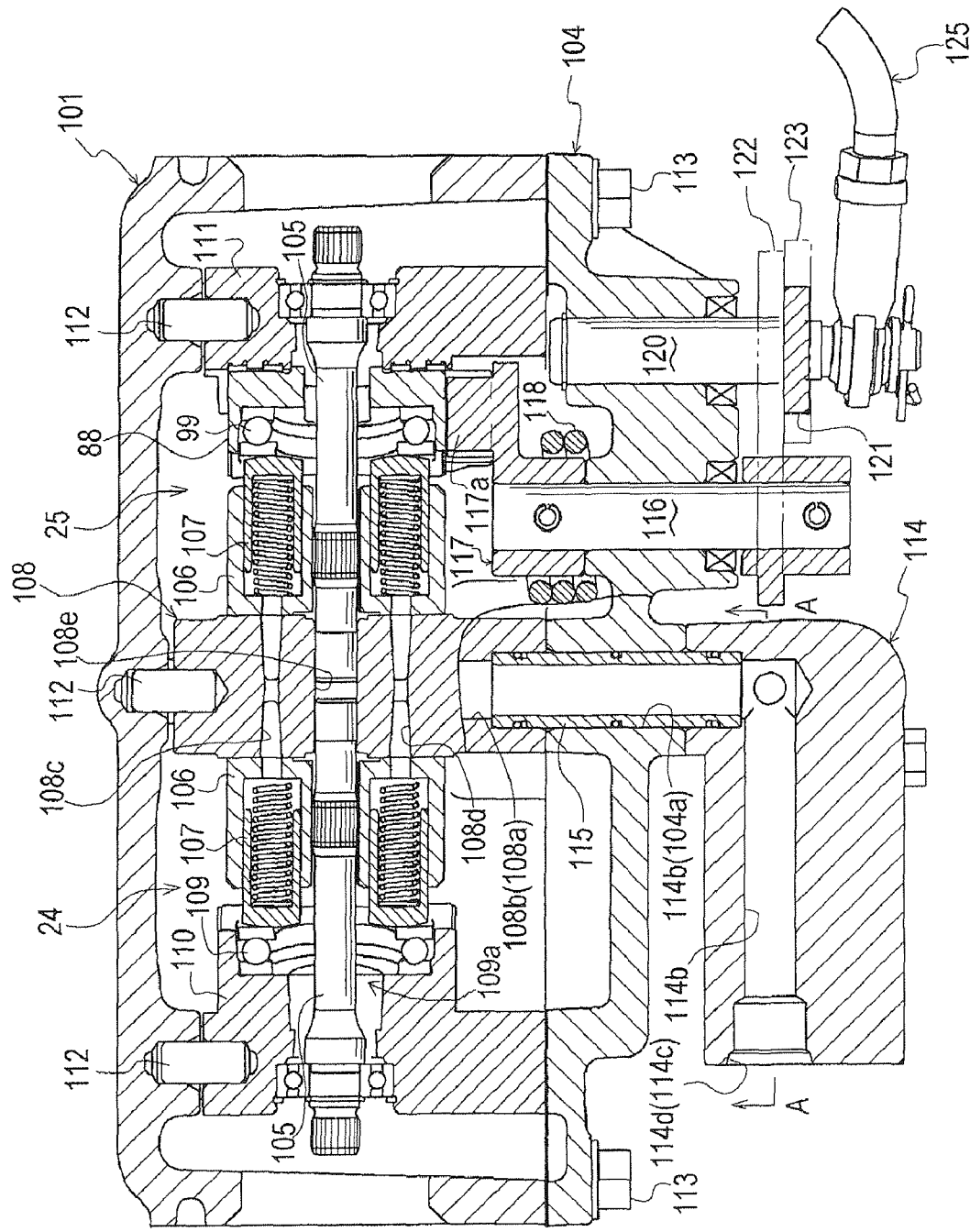
FIG. 6 is a sectional plan view of the motor casing.

The assembly including motor cover 104 and hydraulic motors 24 and 25 (hereinafter, referred to as a motor assembly) will be described with reference to FIGS. 2 to 4, 6, 9 and 11. As shown in FIGS. 4 and 6, each of hydraulic motors 24 and 25 includes a horizontal motor shaft (output shaft) 105, a cylinder block 106 relatively unrotatably fitted on motor shaft 105, and horizontal pistons 107 reciprocally movably fitted into cylinder block 106 around motor shaft 105. Motor shafts 105 are extended laterally distally from respective cylinder blocks 106, and are rotatably integrally connected to respective coaxial transmission shafts 95.

Figure 9:
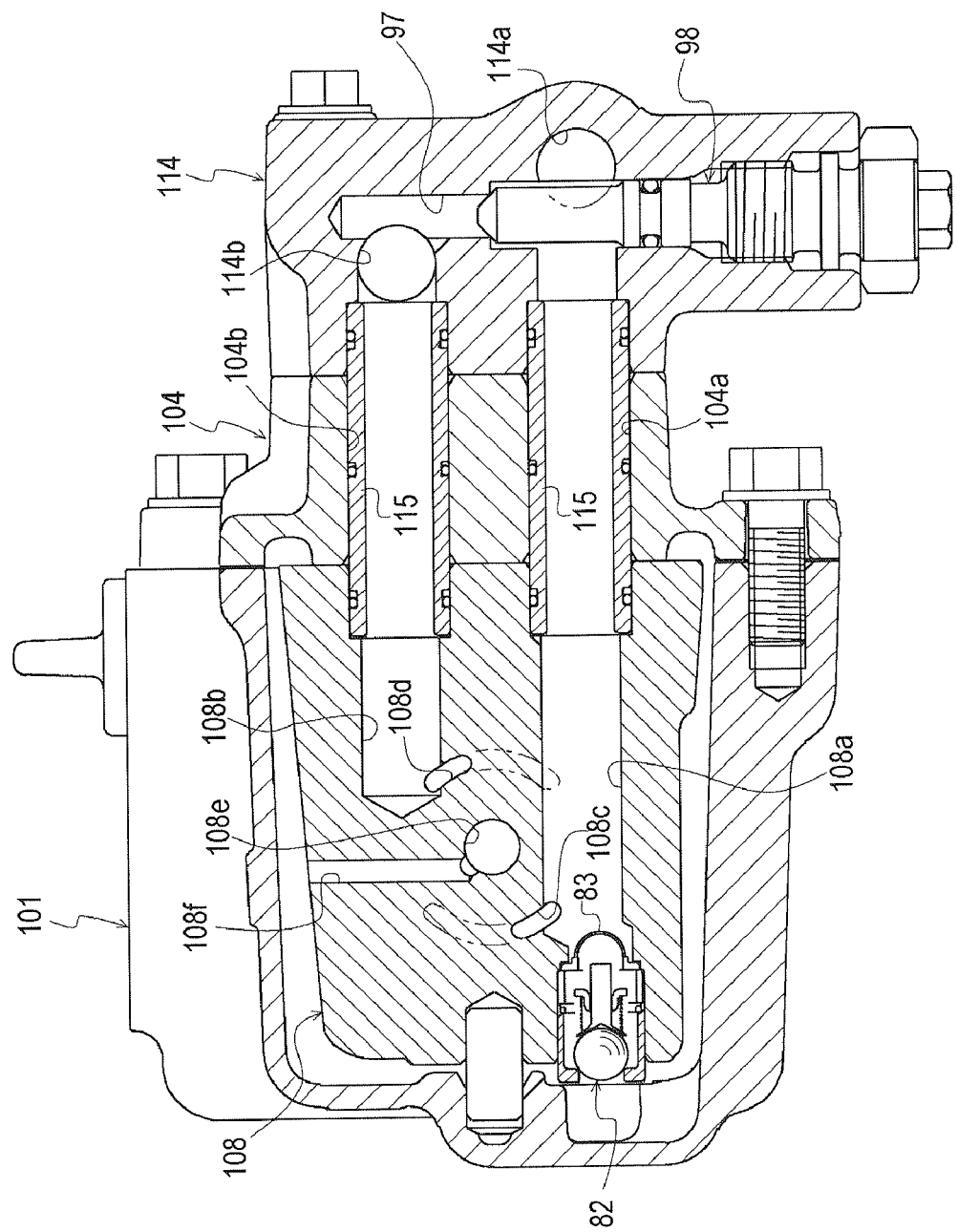
FIG. 9 is a sectional side view of the motor casing with the motor cover and a port block, showing a mechanism for bypassing between a pair of hydraulic motors.

As shown in FIGS. 4, 6 and 9, a vertical plate-shaped center section 108 is disposed between hydraulic motors 24 and 25. As shown in FIGS. 4 and 6, cylinder blocks 106 of hydraulic motors 24 and 25 are slidably rotatably fitted onto left and right side surfaces of center section 108, respectively. As shown in FIGS. 4, 6 and 9, a pair of upper and lower fluid holes 108a and 108b, serving as respective passages 80 and 81 (see FIG. 11), are bored in center section 108 so as to be fore-and-aft extended and opened rearward outward from center section 108. As shown in FIGS. 6 and 9, a pair of front and rear kidney ports 108c and 108d, serving as passages 80a, 80b, 81a and 81b (see FIG. 11), are bored in center section 108 so as to be laterally extended, connected to respective fluid holes 108a and 108b at lateral intermediate portions thereof, and opened leftward and rightward outward from center section 108 to respective cylinder blocks 106.

Fluid sump 84 of front transaxle 10 (see FIG. 11) is provided in motor casing 101. As shown in FIGS. 4, 6 and 9, a horizontal shaft hole 108e is bored in center section 108 between kidney ports 108c and 108d, and opened leftward and rightward outward from center section 108. Motor shafts 105 are rotatably fitted at proximal ends thereof into shaft hole 108e. As shown in FIG. 9, an outward opened lube hole 108f is bored in center section 108, and is opened to a gap between motor shafts 105 in shaft hole 108e, so as to lubricate motor shafts 105 with fluid from fluid sump 84 in motor casing 101 while the motor assembly is installed into motor casing 101.

Figure 2:
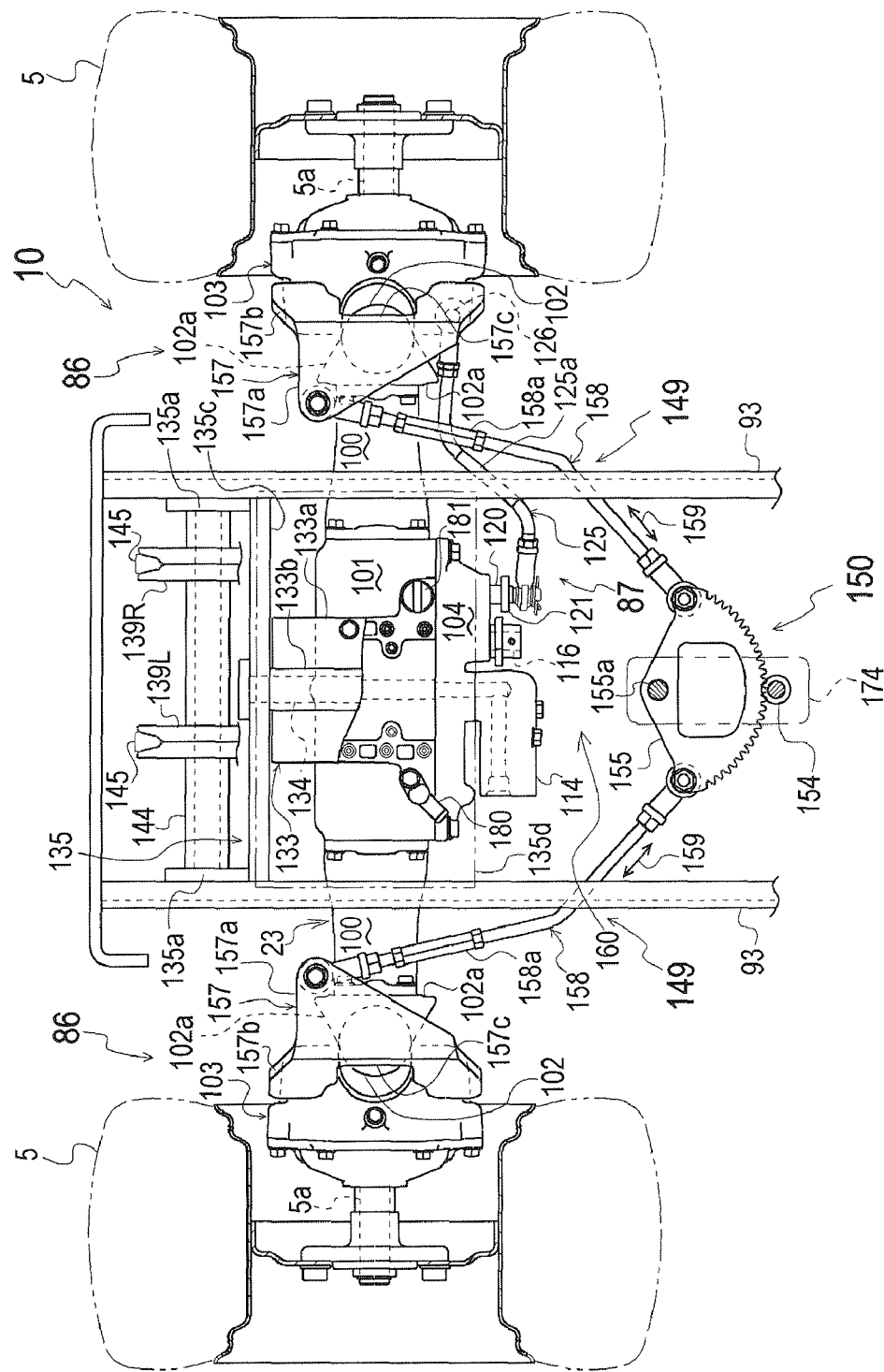
FIG. 2 is a plan view partly in section of the hydrostatic transaxle.

As shown in FIG. 2, a connection port 180 and an oiling port cap 181 covering an upward opened oiling port are provided on a top surface of motor casing 101. When oiling port cap 181 is removed, fluid can be supplied to fluid sump 84 through the opened oiling port. Further, a pipe serving as passage 91 (see FIG. 11) extended from casing 3 of rear transaxle 9 is connected to connection port 180 so as to allow fluid to flow between fluid sump 84 in front transaxle 10 and fluid sump 67 in rear transaxle 9.

As shown in FIGS. 4 and 6, each of hydraulic motors 24 and 25 is provided with a thrust bearing 109 pressed against heads of pistons 107. Fixed displacement hydraulic motor 24 is provided with a fixed swash plate support 110 to which thrust bearing 109 is fixed so as to serve as a fixed swash plate 109a. Preferably, several fixed swash plate supports 110 having different slant angles are prepared so that one having a slant angle which is optimal for fixed swash plate 109a of target fixed displacement hydraulic motor 24 can be selected. Variable displacement hydraulic motor 25 is provided with a movable swash plate support 111 rotatably supporting movable swash plate 88 to which thrust bearing 99 is fixed.

Center section 108 and swash plate supports 110 and 111 are foamed at rear end surfaces thereof with bolts or bolt holes (not shown), respectively, so as to be fastened to a front (inner) surface of motor cover 104 with bolts (not shown), as shown in FIGS. 6 and 9, thereby constituting the motor assembly. Center section 108 and swash plate supports 110 and 111 are formed at front end surfaces thereof with respective joint holes. When the motor assembly is inserted into motor casing 101, these joint holes coincide to respective joint holes formed in a front wall of motor casing 101, and each joint 112 is fitted between each pair of mutually coinciding joint holes, so that center section 108 and swash plate 110 and 111 are engaged at front ends thereof with the front wall of motor casing 101. Then, motor cover 104 covering the rear opening of motor casing 101 is fastened to motor casing 101 by bolts 113, thereby completing installation of the motor casing into motor casing 101.

Figure 3:
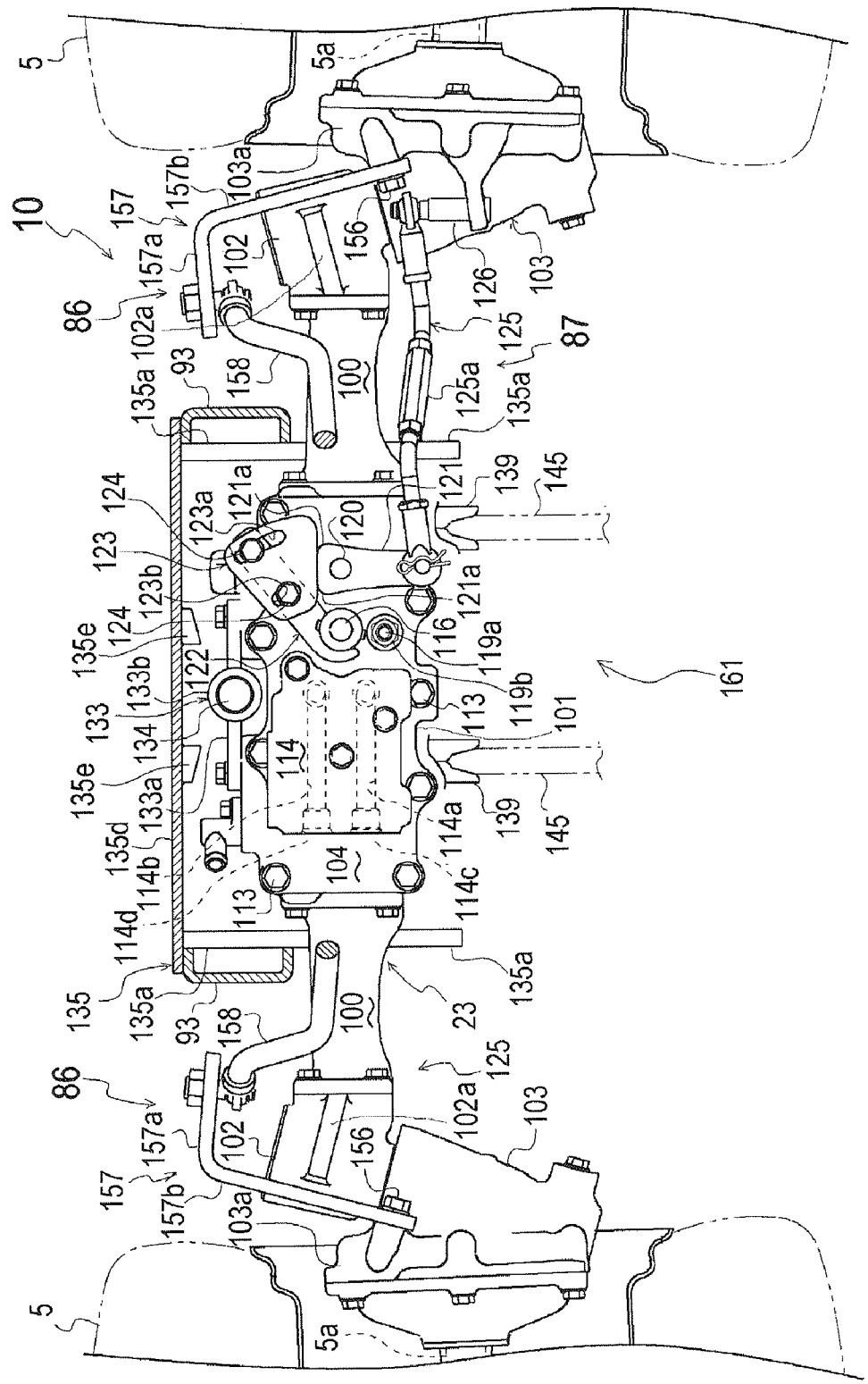
FIG. 3 is a rear view of the hydrostatic transaxle.
Figure 4:
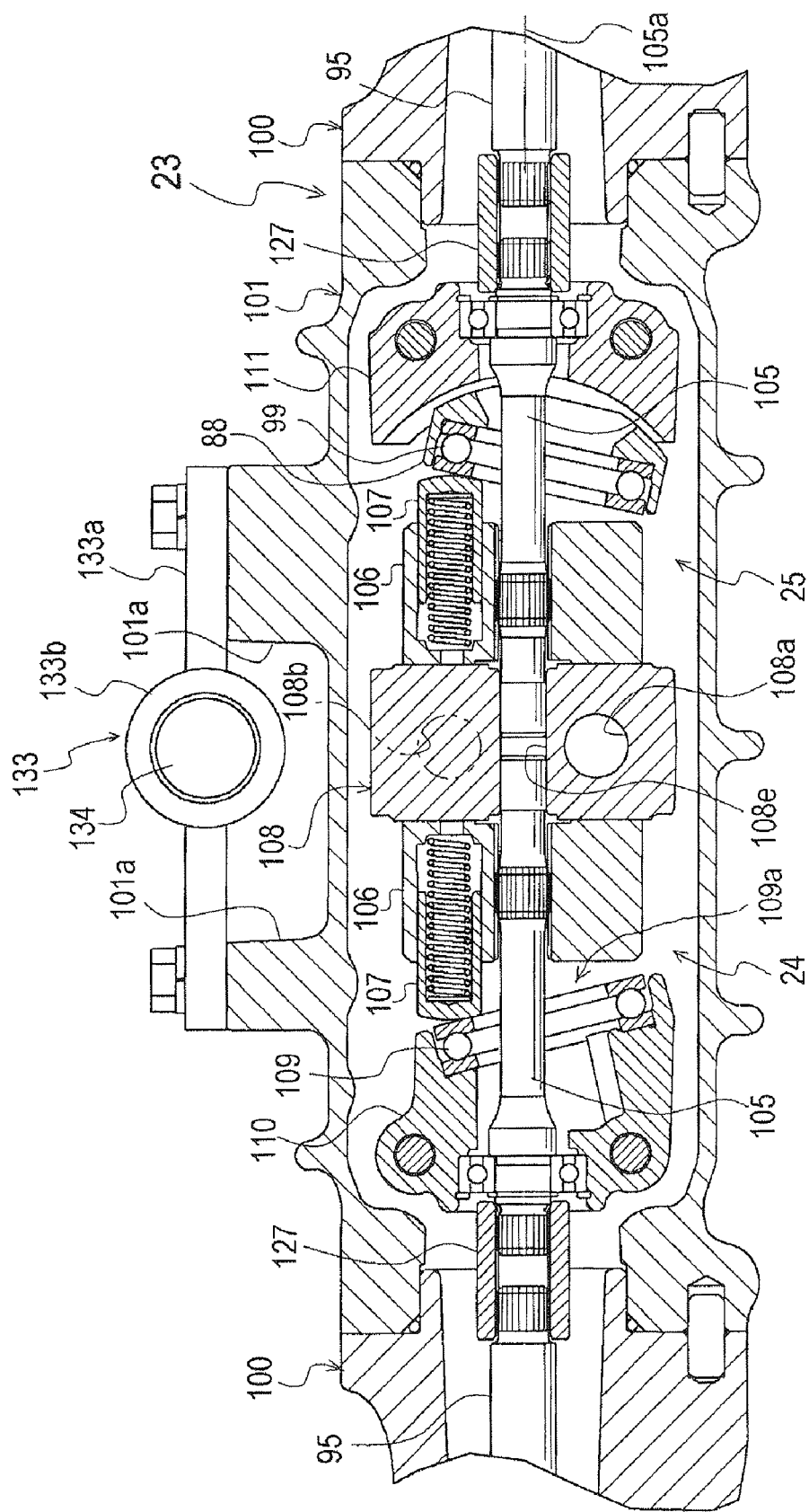
FIG. 4 is a sectional rear side view of a motor casing of the hydrostatic transaxle.

Referring to FIGS. 3, 6 and 9 to 11, in the motor assembly, a port block 114 is fixed onto a rear (outer) surface of motor cover 104. As shown in FIGS. 3, 6 and 9, a pair of fluid holes 104a is bored in motor cover 104 so as to be connected to respective fluid holes 108a and 108b bored in center section 108, and a pair of fluid holes 114a and 114b are bored in port block 114 so as to be connected to respective fluid holes 108a and 108b through respective fluid holes 104a and 104b. Outer ends of fluid holes 114a and 114b are opened outward on a left end surface of port block 114 (laterally opposite to swash plate control linkage 87) so as to serve as respective ports 114c and 114d, corresponding to ports 27a and 27b shown in FIG. 11. The series of fluid holes 114a, 104a and 108a serves as fluid passage 80, and the series of fluid holes 114b, 104b and 108b serves as fluid passage 81.

While fluid holes 108a and 108b in center section 108 are disposed in a lateral center portion of motor casing 101 and are extended in the fore-and-aft direction, due to port block 114, ports 27a and 27b can be disposed at optimal angles to be joined to respective pipes 6a and 6b in consideration of arrangement of swash plate control linkage 87 and the like. The series of fluid holes 114a, 104a and 108a and the series of fluid holes 114b, 104b and 108b are provided therein with respective seal pipes 115 so as to prevent fluid in respective fluid passages 80 and 81 from leaking through a gap between motor casing 101 and motor cover 104 and a gap between motor cover 104 and port block 114.

Figure 10:
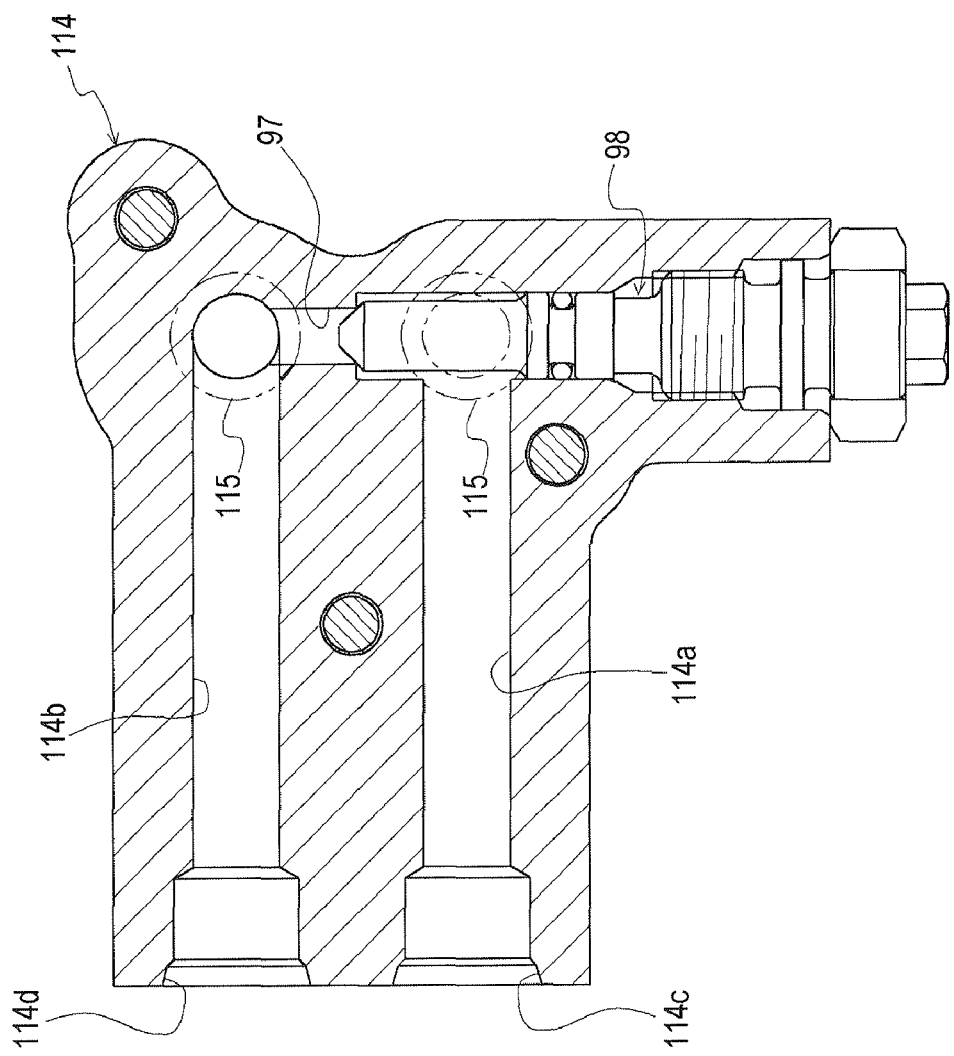
FIG. 10 is a cross sectional view taken along an A-A line of FIG. 6.

As shown in FIGS. 9 to 11, port block 114 is formed therein with bypass system 89 including a bypass fluid hole 97 and a bypass valve 98. Bypass fluid hole 97 is bored in port block 114 and interposed between fluid holes 114a and 114b. Bypass valve 98 is screwed into port block 114 and disposed at an intermediate portion of bypass fluid hole 97.

When working vehicle 1 is towed, both charge check valves 41F and 41R are forcedly opened so as to drain fluid from main fluid passage unit 30 of rear transaxle 9, as mentioned above, and bypass valve 98 of front transaxle 10 is screwed downward so as to be opened, i.e., to fluidly connect fluid passages 80 and 81 to each other through bypass fluid hole 97, thereby allowing fluid to flow between a higher-pressurized portion and a lower-pressurized portion in parallel-motor fluid passage unit 85 bypassing hydraulic motor 24 and 25, and thereby allowing hydraulic motors 24 and 25 to freely rotate following rotation of front wheels 5.

As shown in FIGS. 9 and 11, check valve 82 is connected to kidney port 108c serving as fluid passage 80b so as to supply fluid from fluid sump 84 in motor casing 101 into parallel-motor fluid passage unit 85 when fluid passages 80, 80a and 80b is hydraulically depressed. Check valve 82 is provided with fluid filter 83 interposed between check valve 82 and kidney port 108c.

Figure 7:
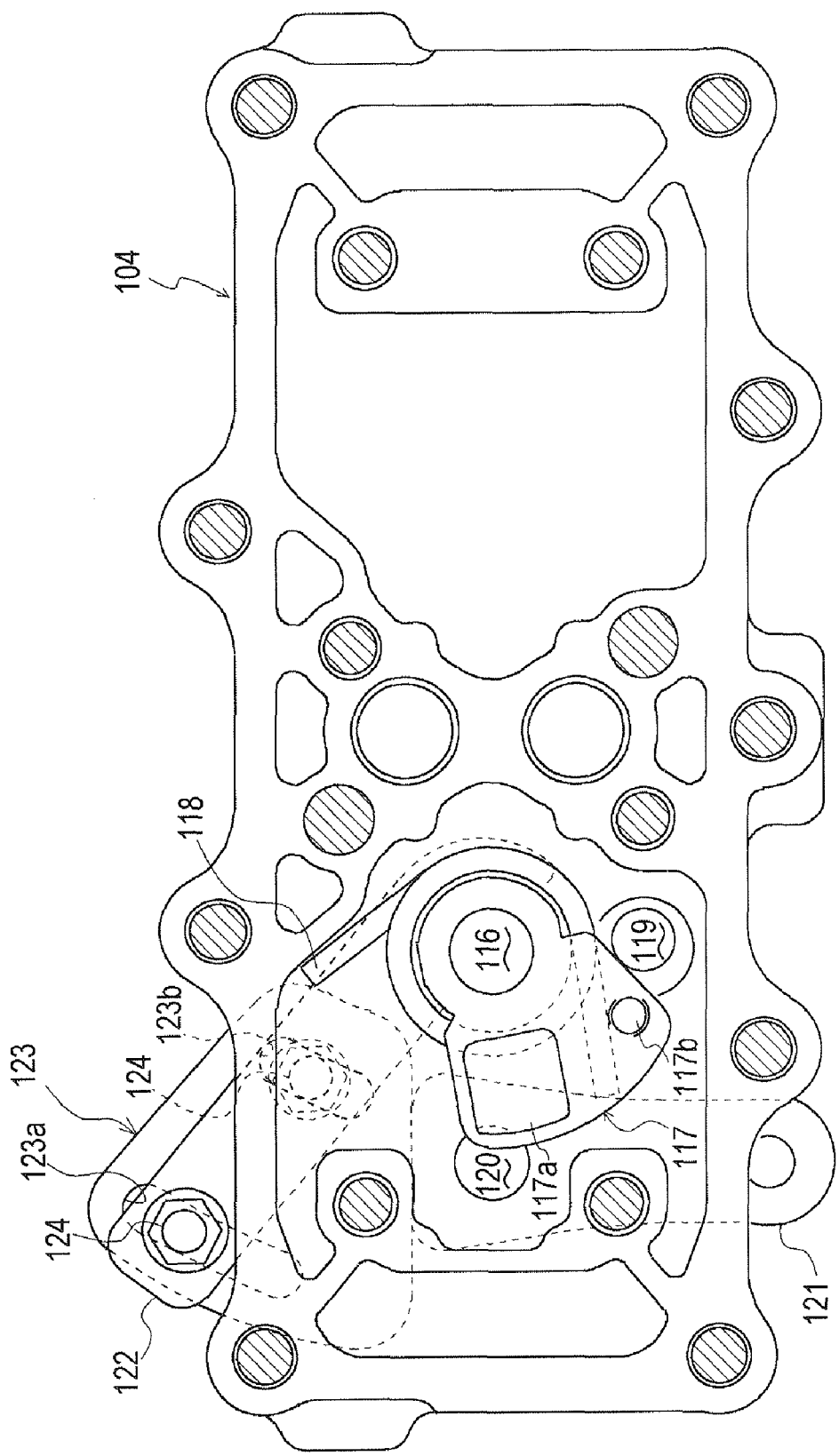
FIG. 7 is a front view partly in section of an inner side of a motor cover.
Figure 8:
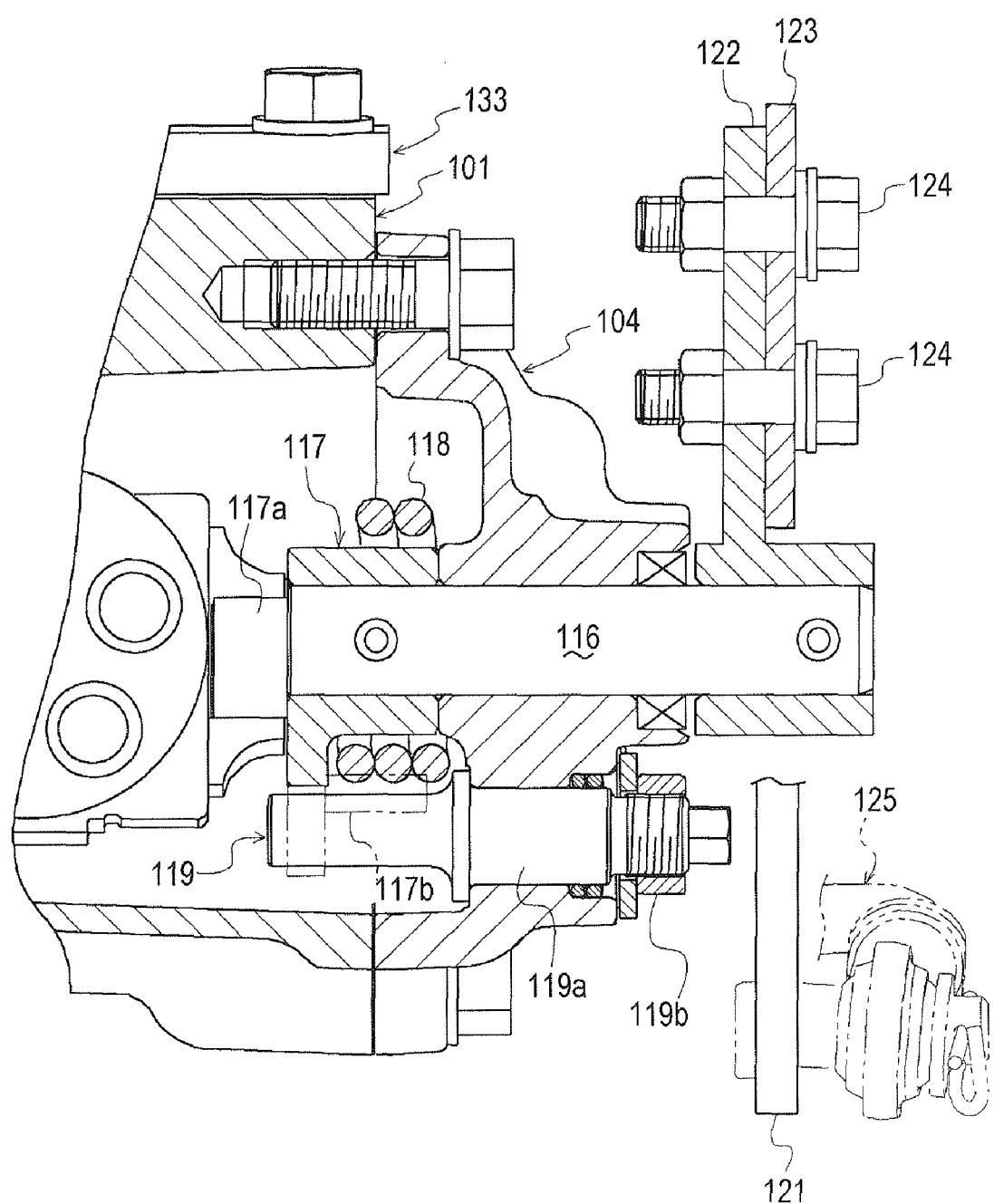
FIG. 8 is a fragmentary sectional side view of the motor casing with the motor cover, supporting a pivot shaft of a movable swash plate of a hydraulic motor.

Referring to FIGS. 2, 3 and 6 to 8, swash plate control linkage 87 will be described. A fore-and-aft horizontal swash plate pivot shaft 116 is rotatably supported by motor cover 104 behind hydraulic motor 25. As shown in FIGS. 6 to 8, an inner arm 117 is fixed on a front end of swash plate pivot shaft 116 in motor casing 101 so as to engage with movable swash plate 88 of hydraulic motor 25. A spring 118 is wound around a boss portion of inner arm 117 fixed on swash plate pivot shaft 116 so as to return swash plate pivot shaft 116 and inner aim 117 to their initial position, i.e., a position for setting movable swash plate 88 at its straight traveling position.

A projection 117a projects from inner arm 117 so as to be fitted to movable swash plate 88. A pushing pin 117b projects from inner arm 117 so as to abut against one end of spring 118. The other end of spring 118 is constantly pressed against an inner side wall of motor casing 101. When swash plate pivot shaft 116, inner arm 117 and movable swash plate 88 are rotated according to turning of working vehicle 1, pin 117b pushes the one end of spring 118 so as to generate a biasing force for returning inner arm 117 and swash plate pivot shaft 116 to their initial position. A stopper pin 119 is planted onto motor casing 101 so as to abut against inner arm 117 disposed at the initial position, i.e., to define the initial position of inner arm 117.

Stopper pin 119 is an eccentric pin normally fastened to motor cover 104 by a nut 119b. When the position of stopper pin 119 is adjusted, nut 119b is loosened and stopper pin 119 is revolved around its center axial portion 119a disposed in a wall of motor cover 104 so as to adjust the position of inner arm 117 to abut against stopper pin 119, i.e., the initial position of inner arm 117 and swash plate pivot shaft 116, thereby eliminating a deviation of their initial position from an initial tilt position of movable swash plate 88.

A camshaft 120 is rotatably supported by motor cover 104 on one lateral side of swash plate pivot shaft 116 and in parallel to swash plate pivot shaft 116. A cam plate 121 is fixed on a rear end of camshaft 120 behind (outside of) motor cover 104. Cam plate 121 is formed with a pair of cam profiles 121a above camshaft 120. When cam plate 121 is disposed at its initial position, i.e., when the pair of steerable casings 103 are disposed for straight traveling of working vehicle 1, a top edge of cam plate 121 between cam profiles 121a is disposed horizontally. An outer arm 122 is fixed on a rear (outer) end of swash plate pivot shaft 116 behind (outside of) motor cover 104. A contact plate 123 is fixed on outer arm 122 so as to abut at its bottom edge against the top edge of cam plate 121.

The position of contact plate 123 fastened to outer arm 122, i.e., the relative position of contact plate 123 to outer arm 122, is adjustable so that the bottom edge of contact plate 123 is surely disposed horizontally to abut against the top edge of cam plate 121 when cam plate 121 is disposed at its initial position regardless of adjustment of the initial positions of inner arm 117, swash plate pivot shaft 116 and outer arm 122 by adjusting the position of stopper pin 119. In this regard, outer arm 122 is formed with a pair of bolt holes at tip and base portions thereof. In correspondence to the bolt holes. A pair of arcuate slots 123a and 123b are formed in contact plate 123. Bolts 124 are passed through respective slots 123a and 123b into the respective bolt holes of outer arm 122, and are provided with respective nuts so as to fasten contact plate 123 to outer arm 122. When the relative position contact plate 123 to outer arm 122 has to be changed, the nuts on bolts 124 are loosened and the positions of bolts 124 in respective slots 123a and 123b are adjusted. Due to this structure, swash plate control linkage 87 corresponds to vehicles having various steering angle setting patterns.

Cam plate 121 is extended downward from camshaft 120. An acceleration rod 125 is pivoted at one end thereof onto a lower end portion of downward extended cam plate 121, and is pivoted at the other end thereof onto a pivot pin 126 planted on one of steerable casings 103. Preferably, pivot pin 126 is planted on steerable casing 103 supporting front wheel 5 drivingly connected to variable displacement hydraulic motor 25.

Due to this structure, when steerable casing 103 is rotated around corresponding kingpin casing 102, acceleration rod 125 is pushed or pulled so as to laterally rotate the lower end of cam plate 121. Accordingly, the top edge of cam plate 121 is tilted so that one of cam profiles 121a rises to push contact plate 123 upward so as to upwardly rotate outer arm 122 together with swash plate pivot shaft 116 and inner arm 117. In this way, the tilt angle of movable swash plate 88 is reduced so as to reduce the displacement of hydraulic motor 25. As mentioned above, the displacement reduction of hydraulic motor 25 causes increase of fluid flow to hydraulic motor 24. As a result, both hydraulic motors 24 and 25 are accelerated so that left and right front wheels 5 are accelerated according to their leftward or rightward turning with steerable casings 103.

On the outer (rear) surface of motor cover 104, swash plate control linkage 87 is disposed behind only variable displacement hydraulic motor 25, so that a wide space for port block 114 is ensured just behind fixed displacement hydraulic motor 24 laterally opposite to hydraulic motor 25, and just behind a portion (center section 108) between hydraulic motors 24 and 25, thereby optimally arranging pipes 6a and 6b connected port block 114.

As shown in FIGS. 2 and 3, acceleration rod 125 includes an adjusting member 125a at an intermediate portion thereof. Adjusting member 125a can be telescoped in correspondence to the above-mentioned adjustment of tread, i.e., depending on whether a spacer is interposed between motor casing 101 and axial side casing 100.

A driving power transmission system from each of motor shafts 105 of hydraulic motors 24 and 25 to each front wheel 5 will be described with reference to FIGS. 4 and 5. In this regard, as mentioned above, FIG. 5 illustrates only representative right steering wheel support unit 86. As shown in FIG. 4, motor shaft 105 of hydraulic motor 24 is rotatably passed through fixed swash plate 109 and fixed swash plate support 110, motor shaft 105 of hydraulic motor 25 is rotatably passed through movable swash plate 88 and movable swash plate support 111, and transmission shafts 95 in respective axial side casings 100 are drivingly and coaxially connected to respective motor shafts 105. A cylindrical coupling 127 is disposed in a proximal end portion of each of axial side casings 100 so as to be spline-fitted on transmission shaft 95 and motor shaft 105, so that motor shaft 105 and transmission shaft 95 are rotatably integrally connected to each other so as to serve as an output shaft of each of hydraulic motors 24 and 25. Alternatively, instead of transmission shafts 95, only motor shafts 105 may be extended into axial side casings 100 so as to serve as output shafts of hydraulic motors 24 and 25.

As shown in FIG. 5, a bevel gear shaft 128 is journalled in a distal end portion of each of axial side casings 100 so as to be drivingly and coaxially connected to a distal end of corresponding transmission shaft 95. Another cylindrical coupling 127 is spline-fitted on transmission shaft 95 and bevel gear shaft 128 so as to rotatably integrally connect transmission shaft 95 to bevel gear shaft 128. The distal end portion of each of axial side casings 100 is inserted into kingpin casing 102. A distal end of bevel gear shaft 128 is formed thereon with a bevel gear 128a, and projects outward from the distal end of axial side casing 100 into an upper chamber in kingpin casing 102.

In the portion of kingpin casing 102 extended downward from the upper chamber, a kingpin center shaft 129 is coaxially disposed on the rotary axis of kingpin casing 102. In the upper chamber of kingpin casing 102, an upper bevel gear 129a is fixed on a top of kingpin center shaft 129 and is rotatably supported by kingpin casing 102 through a bearing, so as to mesh with bevel gear 128a. Kingpin casing 102 has a large top opening facing the upper chamber incorporating bevel gears 128a and 129a, so as to reduce the manufacturing costs of kingpin casing 102, and to easily and precisely form bearing grooves in an inner wall of kingpin casing 102. After all components including the bevel gears are completely set in kingpin casing 102, a grommet 130 is fitted to kingpin casing 102 so as to cover the top opening of kingpin casing 102.

The downward extended portion of each kingpin casing 102 is inserted into corresponding steerable casing 103, and relatively rotatably supported by steerable casing 103 through bearings 175 and 176, as mentioned above, thereby constituting steerable wheel support unit 86 in which steerable casing 103 is laterally rotatable centered on kingpin casing 102. A bottom end of kingpin center shaft 129 projects downward from a bottom end of kingpin casing 102 into steerable casing 103 so as to be fixedly provided thereon with a bevel gear 129b which is rotatably supported by a bottom end portion of steerable casing 103 through a bearing.

Each steerable casing 103 is formed at a laterally distal portion thereof with a bearing cover support portion 103a, and axle 5a is journalled at a proximal end thereof onto a central portion of bearing cover support portion 103a through a bearing. A diametrically large bevel gear 131 is fixed on axle 5a and meshes with bevel gear 129b. A bearing cover 132 is fastened to bearing cover support portion 103a so as to cover bevel gear 131. Axle 5a is journalled by bearing cover 132 through a bearing, and projects outward from bearing cover 132 so as to be provided on a distal end thereof with front wheel 5.

In this way, while front wheels 5 can be turned by rotating steerable casings 103 around respective kingpin casings 102, front wheels 5 receive outputs from respective hydraulic motors 24 and 25 through respective motor shafts 105, transmission shafts 95 and kingpin center shafts 129.

A structure for supporting front transaxle 10 onto working vehicle 1 will be described with reference to FIGS. 1 to 5. A pair of left and right stays 101a project upward from a top surface of motor casing 101, and a center pin bracket 133 is fixedly laid between stays 101a. Center pin bracket 133 includes a horizontal rectangular plate 133a and a fore-and-aft axial boss 133b integrally formed on a lateral center portion of plate 133a. Plate 133a is fastened at four corners onto stays 101a by bolts. A center pin 134 is relatively rotatably passed through boss 133b.

A front transaxle bracket 135 is fixedly provided on a front portion of vehicle frame 93. Front transaxle bracket 135 includes vertical left and right side plates 135a, a vertical rear plate 135b, a vertical front plate 135c and a horizontal plate 135d. Left and right side plates 135a are fixed on respective left and right side plate portions of vehicle frame 93. Rear plate 135b is spanned between the left and right side plate portions of vehicle frame 93. Front plate 135c is spanned between the left and right side plate portions of vehicle frame 93, and is fixed to rear ends of left and right side plates 135a so as to connect left and right side plates 135a to each other. Horizontal plate 135d is laid between rear and front plates 135b and 135c. Engine 14 is mounted on horizontal plate 135d. Rear plate 135b is disposed just behind center pin bracket 133, front plate 135c is disposed just in front of center pin bracket 133, and center pin 134 passed through boss 133b of center pin bracket 133 is journalled at rear and front ends thereof by respective rear and front plates 135b and 135c. In this way, front transaxle 10 is supported at a lateral middle portion thereof by vehicle frame 93 through center pin 134 so as to be vertically swingable at left and right ends thereof centered on center pin 134.

Horizontal plate 135d covers the top of motor casing 101. Left and right stoppers 135e projects downward from horizontal plate 135d so that boss 133b of center pin bracket 133 through which center pin 134 is passed is disposed between stoppers 135e in the lateral direction. Left and right stoppers 135e are adapted to abut against plate 133a of center pin bracket 133 when front transaxle 10 is rotated centered on center pin 134, thereby defining a limit of tillable range of front transaxle 10 centered on center pin 134.

A steering system for front transaxle 10 will be described with reference to FIGS. 1 to 5 and 14. As shown in FIGS. 2 and 3, in each of steerable wheel support units 86, a steering arm 157 is fastened at front and rear bottom ends thereof onto laterally proximal side surfaces of bearing cover support portion 103a of steerable casing 103 by respective bolts 156. Steering arm 157 is L-like bent in a rear view (see FIG. 3) so as to have a substantially horizontal plate 157a and front and rear legs 157b extended laterally distally downward from plate 157a. Front and rear legs 157b are fitted onto the laterally proximal side surfaces of bearing cover support portion 103a so as to be fastened by respective bolts 156, and the upper portion of kingpin casing 102 is disposed in a space 157c between front and rear legs 157b.

The pair of left and right steering arms 157 and a pair of left and right connection rods 158 constitute a steering linkage 149 to be connected to steering operation mechanism 150. Each of left and right connection rods 158 has a laterally distal end pivoted on plate 157a of each steering arm 157. Left and right connection rods 158 are extended laterally proximally rearward from the ends pivoted on respective steering arms 157, so as to approach each other at rear ends thereof, thereby being operatively connected to steering operation mechanism 150 (especially, a later-discussed sector gear 155) spaced rearward from front transaxle 10. In other words, left and right connection rods 158 are arranged in a V-shape when viewed in plan so as to be connected to a common rotary member of steering operation mechanism 150. Connection rods 158 are bent at intermediate portions thereof to be passed below the left and right side plate portions of vehicle frame 93, respectively, so as to be operatively connected to steering operation mechanism 150. Connection rods 158 include respective turn buckles 158a at intermediate portions thereof, similar to acceleration rod 125, so as to be telescoped in correspondence to variation of turning performance or layout.

Steering operation mechanism 150 includes a pinion 154 and a sector gear 155 meshing with pinion 154. In this regard, as shown in FIG. 1, a steering column is provided in a dashboard 152 so as to support a steering wheel shaft 153 fixedly provided on a top thereof with steering wheel 8. Pinion 154 is fixed on a bottom end of steering wheel shaft 153. Sector gear 155 meshes with a front end of pinion 154. A steering gear support frame 174 is fixed on vehicle frame 93 so as to rotatably support a vertical pivot shaft 155a of sector gear 155. Left and right connection rods 158 of steering linkage 149 are pivoted at rear ends thereof on respective left and right ends of sector gear 155.

Due to the structure, when steering wheel 8 is rotated, sector gear 155 is rotated through steering wheel shaft 153 and pinion 154 so as to push one connection rod 158 and pull the other connection rod 158 in a direction designated by an arrow 159. Accordingly, left and right steerable casings 103 are simultaneously rotated centered on respective kingpin casings 102 at substantially equal angles in the same direction together with steering arms 157 onto which connection rods 158 are pivoted. Incidentally, as shown in FIGS. 2 and 3, front and rear stoppers 102a project on a top portion of each kingpin casing 102 so as to be adapted to abut against corresponding steering arm 157, thereby defining leftward and rightward turning limit angles of corresponding steerable casing 103.

Due to rearward extended connection rods 158, steerable casings 103 are operatively connected to sector gear 155 (a common rotary member) of steering operation mechanism 150 spaced (placed considerably distantly) rearward from front transaxle 10. Consequently, a large back space 160 surrounded by left and right connection rods 158 and sector gear 155 is ensured behind front transaxle 10. Further, due to the telescopic extension of connection rods 158 with turn buckles 158a, back space 160 can be further expanded rearward, i.e., sector gear 155 can be spaced further rearward from front transaxle 10. In addition to back space 160, a large under space 161 is ensured between steerable casings 103 under casing 23 (i.e., motor casing 101 and left and right axial side casings 100) because no connection member such as a conventional tie rod is interposed between steerable casings 103.

Therefore, swash plate control linkage 87, port block 114 and other members are attached onto the rear end surface of front transaxle 10 (motor cover 104) so as to be prevented from interfering with steering linkage 149. Further, pipes 6a and 6b for fluid flow between front and rear transaxles 9 and 10, a later-discussed mower driving belt 145 and the like are easily passed through back space 160 and under space 161 so as to be optimally arranged without interference with each other or another member.

With respect to lower space 161, as shown in FIGS. 4 and 5, rotary axes 105a of motor shafts 105 of hydraulic motors 24 and 25 are disposed at a substantially vertical middle portion of casing 23, at such a high level of the upper portions of steerable wheel support units 86. On the other hand, left and right axles 5a disposed on laterally outward from casing 23 are supported at the lower portions of respective steerable wheel support units 86 so as to be disposed lower than rotary axes 105a. Consequently, casing 23 and left and right steerable wheel support units 86 attached on the left and right ends of casing 23 are arranged in a gate-like shape when viewed in rear (front), so as to ensure a large vertical width of under space 161.

To conclude description of the connection system of front transaxle 10 to steering operation mechanism 150, due to steering linkage 149 including left and right rearward extended connection rods 158, steering operation mechanism 150 can be spaced rearward from front transaxle 10 so as to ensure large back space 160 and under space 161 in the vicinity of front transaxle 10. Further, due to the gate-shaped arrangement of front transaxle 10 in a rear (or front) view, under space 161 is vertically expanded.

Such large spaces 160 and 161 are advantageous in arranging a power transmission system to front transaxle 10 optimally for power transmission efficiency, assembly and maintainability without interfering with the components for steering operation of steerable wheel support units 86. In this embodiment, this power transmission system is piping 6 including pipes 6a and 6b for supplying fluid to front transaxle 10. Especially, large spaces 160 and 161 are advantageous for the two-motor type front transaxle 10 including hydraulic motors 24 and 25 for driving respective left and right axles 5a because it requires a complex and large fluid supply system. Even if the power transmission system is a mechanism including a propeller shaft and front transaxle 10 has a mechanical differential unit replacing hydraulic motors 24 and 25, the propeller shaft can be easily disposed through large space 160 or 161.

Further, vertically large under space 161 is advantageous for ensuring a large ground clearance under front transaxle 10, especially, for traveling of an agriculture tractor over a ridge, for example.

Figure 17:
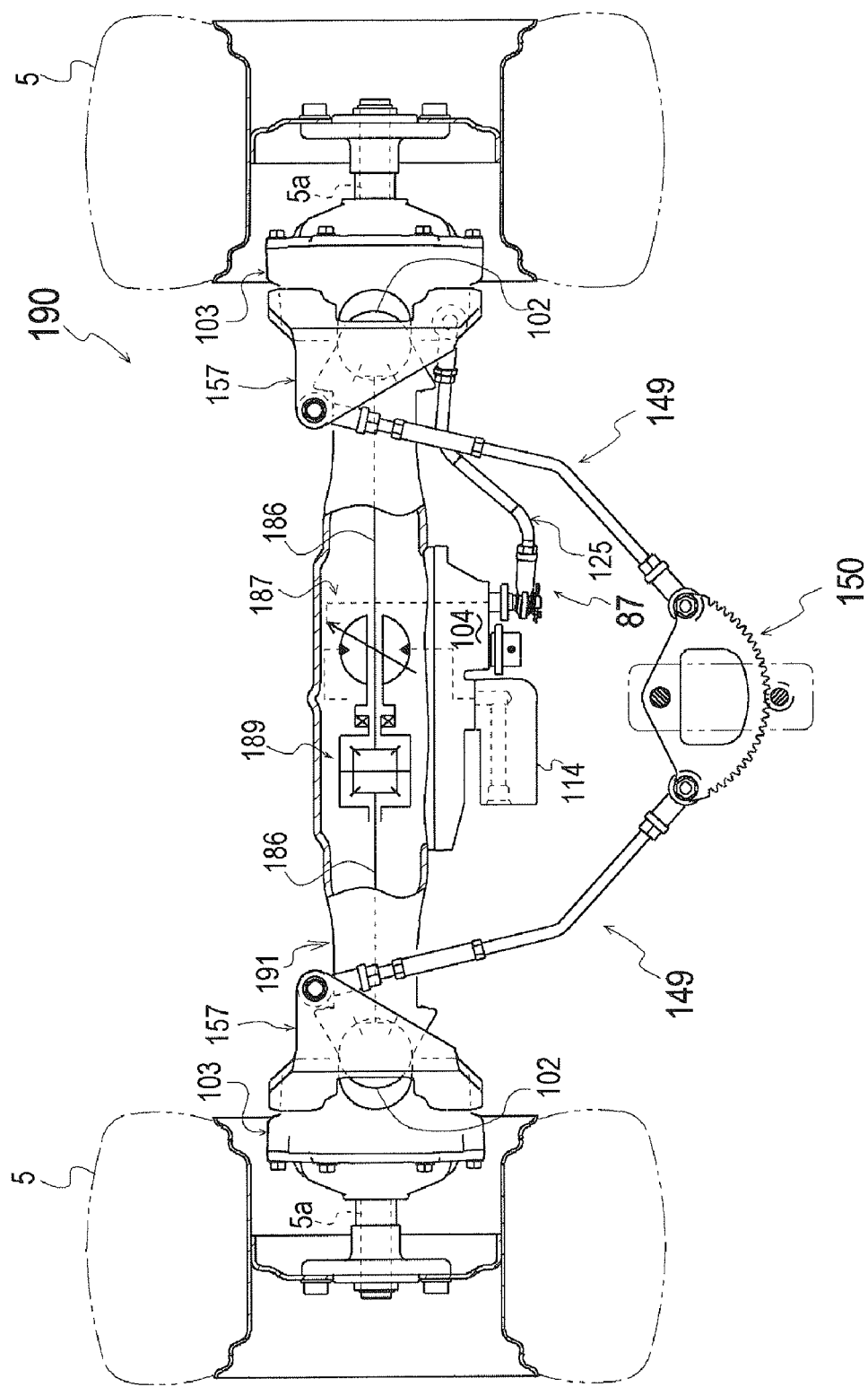
FIG. 17 is a plan view partly in section of an alternative hydrostatic transaxle incorporating a single hydraulic motor.

Referring to FIG. 17, an alternative front transaxle 190 including a single hydraulic motor 187 will be described. Front transaxle 190 includes a casing 191 incorporating variable displacement hydraulic motor 187 and a differential unit 189 drivingly connected to a motor shaft of hydraulic motor 187. Left and right output shafts 186 are extended leftward and rightward from differential unit 189 so as to be drivingly connected to respective axles 5a. Front transaxle 190 is provided with swash plate control linkage 87 including acceleration rod 125, similar to that of front transaxle 10, operatively connected to one (in this embodiment, right) front wheel 5 so as to reduce a displacement of hydraulic motor 187, i.e., to accelerate hydraulic motor 187, according to an increase of turning angle of the front wheel 5.

Referring to FIGS. 1 to 3 and 16, mower-driving transmission system 11 for transmitting power from engine 14 to mower 12 will be described. Mower-driving transmission system 11 includes pulleys 138, 139L, 139R and 142 and a mower-driving belt 145 looped over pulleys 138, 139L, 139R and 142. In this regard, as shown in FIGS. 1 to 3, a flywheel 143 is fixed on a front portion of engine output shaft 36 projecting horizontally forward from engine 14, and laterally vertical engine output pulley 138 is fixed at a front end of engine output shaft 36 in front of flywheel 143. A lateral horizontal pulley shaft 144 is spanned between left and right side plates 135a of front transaxle bracket 135 below engine output pulley 138, and the pair of fore-and-aft vertical intermediate pulleys 139L and 139R are fore-and-aft rotatably fitted on pulley shaft 144.

A roller base 146 projects upwardly forward from a front end portion of a mower deck 12b of mower 12. A pair of left and right fore-and-aft vertical first guide rollers 140L and 140R are pivoted on roller base 146 through respective lateral horizontal pivots 140a so as to be rotatably separate from each other, i.e., to be rotatable opposite to each other. A roller base 147 projects upward from mower deck 12b behind roller base 146. A pair of left and right fore-and-aft vertical second guide rollers 141L and 141R are pivoted on roller base 147 through respective lateral horizontal pivots 141a so as to be rotatably separate from each other, i.e., to be rotatable opposite to each other. Gearbox 12a is mounted on a top surface of mower deck 12b behind roller base 147, and a vertical mower input shaft 148 projects upward from gearbox 12a so as to be fixedly provided with horizontal mower input pulley 142.

Mower-driving belt 145 is interposed between engine output pulley 138 and mower input pulley 142 through the pair of intermediate pulleys 139L and 139R, the pair of first guide rollers 140L and 140R and the pair of second guide rollers 141L and 141R. More specifically, a left line of mower-driving belt 145 between pulleys 138 and 142 is looped over left intermediate pulley 139L, left first guide roller 140L and left second guide roller 141L, and a right line of mower-driving belt 145 between pulleys 138 and 142 is looped over right intermediate pulley 139R, right first guide roller 140R and right second guide roller 141R, so that the left and right lines of mower-driving belt 145 move in opposite directions according to rotation of engine output shaft 36. Due to guide rollers 140L, 140R, 141L and 141R, mower-driving belt 145 is kept to have a constant space from mower deck 12b and gearbox 12a regardless of vertical movement of mower 12. Therefore, the highest lift position of mower 12 can be further raised.

Further, due to the pair of intermediate pulleys 139L and 139R and the pair of first guide rollers 140L and 140R, mower-driving belt 145 extended vertically downward from vertical engine output pulley 138 is bent downwardly rearward, and due to the pair of first guide rollers 140L and 140R and the pair of second guide rollers 141L and 141R, mower-driving belt 145 extended downwardly rearward from intermediate pulleys 139L and 139R is bent upwardly rearward, and bent horizontally rearward (more specifically, in parallel to the top surfaces of gearbox 12a and mower deck 12b regardless of vertical movement of mower 12) to be looped over horizontal mower input pulley 142. Consequently, only one mower-driving belt 145 is used to drivingly connect vertical mower input shaft 148 to horizontal engine output shaft 36, thereby reducing the number of components and costs, and facilitating maintenance.

A pair of left and right mower-lifting cradles 136 are fixedly extended downward and rearward from front ends of respective left and right side plates 135a of front transaxle bracket 135, and link rods 137 are pivotally extended rearward from respective cradles 136 so as to be connected to roller base 146 projecting upwardly forward from the front end portion of mower deck 12b, thereby guiding mower 12 which is lifted up or down.

Figure 16:
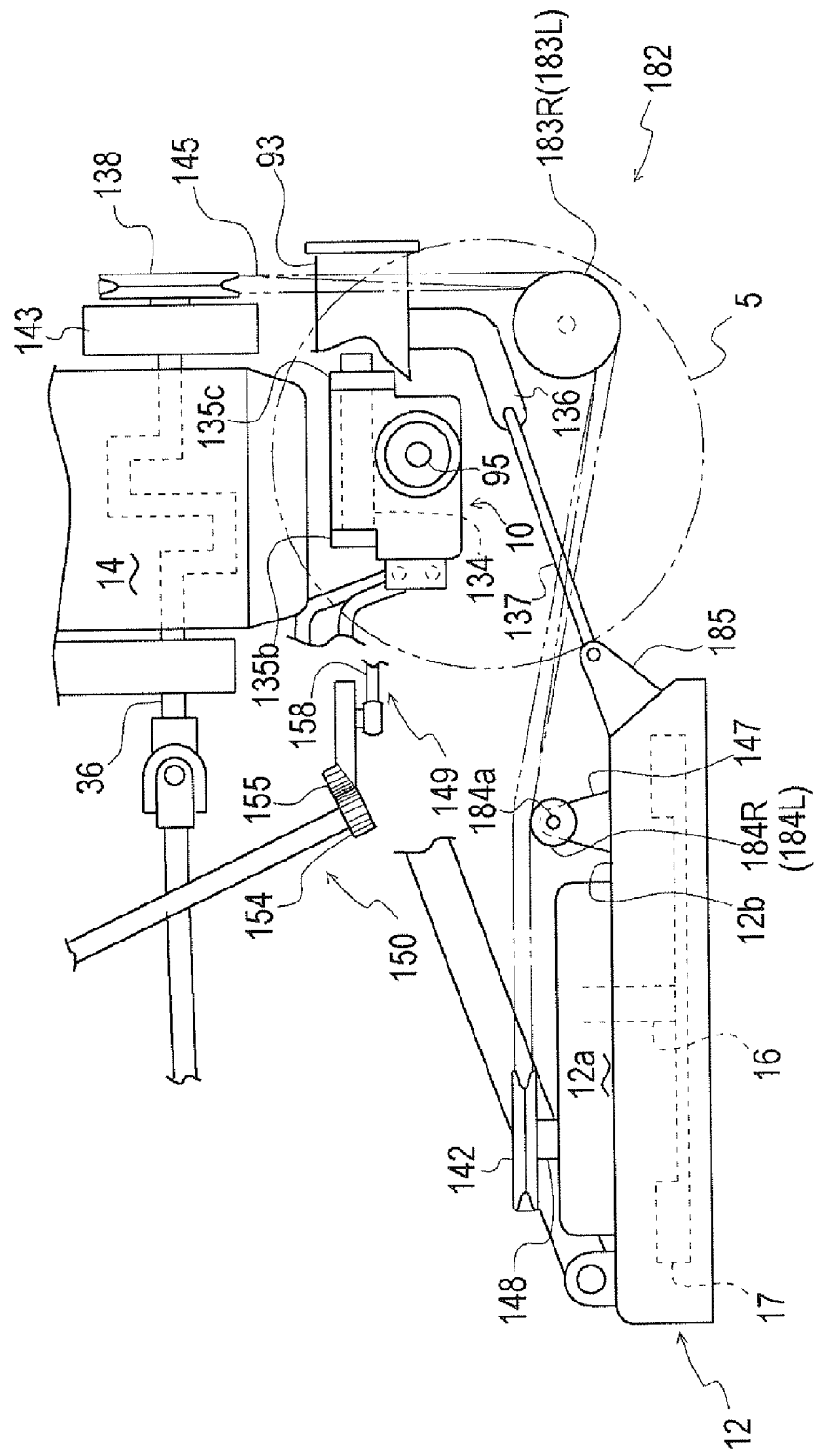
FIG. 16 is a side view of a front lower portion of the working vehicle, showing an alternative mower-driving transmission system.

Referring to FIG. 16, an alternative mower-driving transmission system 182 including pulleys 138, 183L, 183R and 142 and mower-driving belt 145 will be described. Left and right intermediate pulleys 183L and 183R are disposed so as to correspond to further lowered pulleys 139L and 139R. Only roller base 147 projecting upward from mower deck 12b is provided with a pair of left and right guide rollers 184L and 184R over which the left and right lines of mower-driving belt 145 are looped between the pair of intermediate pulleys 183L and 183R and mower input pulley 142. Due to intermediate pulleys 183L and 183R, mower-driving belt 145 extended vertically downward from engine output pulley 138 is bent rearward, and due to guide rollers 184L and 184R, mower-driving belt 145 extended upwardly rearward from intermediate pulleys 183L and 183R is bent horizontally rearward (more specifically, in parallel to the top surfaces of gearbox 12a and mower deck 12b regardless of vertical movement of mower 12) to mower input pulley 142.

Due to guide rollers 184L and 184R and lowered intermediate pulleys 183L and 183R, mower-driving belt 145 is kept to have a constant space from mower deck 12b and gearbox 12a regardless of vertical movement of mower 12. Only one mower-driving belt 145 is used to drivingly connect vertical mower input shaft 148 to horizontal engine output shaft 36, and the guide rollers are reduced in number, thereby reducing the number of components and costs, and facilitating maintenance.

A base 185 projects upwardly forward from the front end of mower deck 12b so as to correspond to roller base 146. Base 185 with no guide roller pivoted thereon is used only for pivotally supporting link rods 137 extended from cradles 136, thereby ensuring the simplicity of mower-driving transmission system 182.

Figure 12:
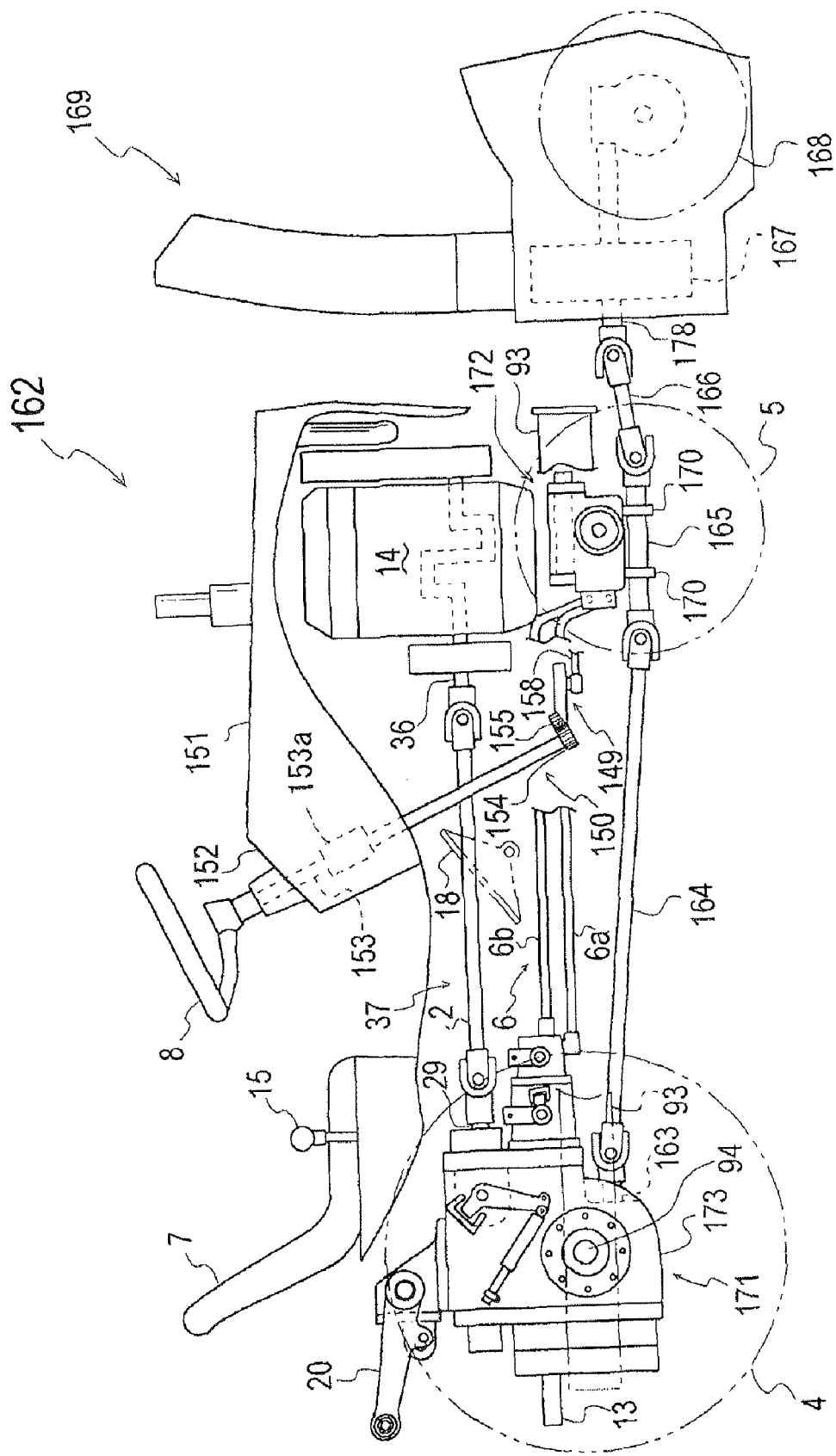
FIG. 12 is a side view partly in section of an alternative working vehicle equipped with the hydrostatic transaxle according to the invention.

FIG. 12 illustrates an alternative working vehicle 162 equipped at a front portion thereof with a snow-removing unit 169, serving as an example of a front-mount working machine. Only different points of working vehicle 162 from working vehicle 1 will be described.

An alternative rear transaxle 171 includes a casing 173 incorporating hydraulic motor 22 for driving rear wheels 4 through axles 94. A horizontal mid PTO shaft 163 driven by hydraulic motor 22 projects forward from a lower front portion of casing 173 so as to be drivingly connected to a working machine disposed in front of working vehicle 162, i.e., snow-removing unit 169. Front and rear support stays 170 are extended downward from an alternative front transaxle 172, and rotatably support a fore-and-aft horizontal second propeller shaft 165. A first propeller shaft 164 is interposed between a front end of mid PTO shaft 163 and a rear end of second propeller shaft 165.

Snow-removing unit 169 includes a snowplowing auger 168 and a blower 167 for blowing out snow plowed by snowplowing auger 168. Snow-removing unit 169 has a rearwardly horizontally projecting input shaft 178 for driving blower 167 and snowplowing auger 168. A third propeller shaft 166 is interposed between a front end of second propeller shaft 165 and a rear end of input shaft 178. Preferably, universal joints are interposed between shafts 163 and 164, between shafts 164 and 165, between shafts 165 and 166, and between shafts 166 and 178, respectively.

Front transaxle 172 is provided with the above-mentioned steering linkage 149 so as to be operatively connected to steering operation mechanism 150 spaced rearward from front transaxle 172, and is arranged in the above-mentioned gate-like shape, thereby ensuring large back and under spaces 160 and 161 advantageously for arranging shafts 164, 165 and 166 interposed between mid PTO shaft 163 of rear transaxle 171 and the working machine, i.e., snow-removing unit 169, disposed in front of front transaxle 172.

Figure 13:
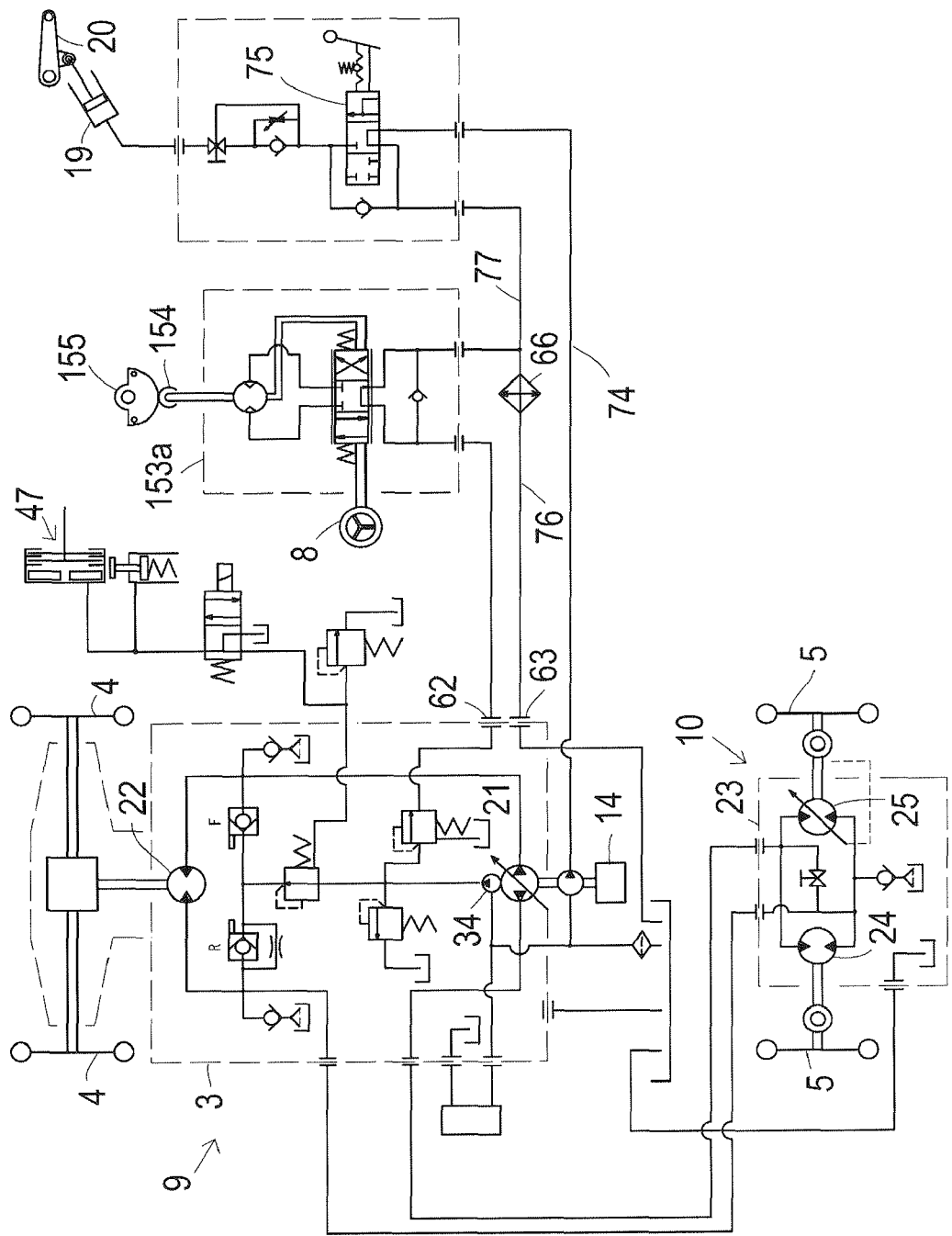
FIG. 13 is a hydraulic circuit diagram of the working vehicle of FIG. 12.

In working vehicle 162, steering wheel shaft 153 of steering operation mechanism 150 is provided at an axial intermediate portion thereof with a torque generator 153a for hydraulically amplifying an operator's operation force for driving pinion 154. As shown in FIG. 13, in the hydraulic circuit, torque generator 153a serving as the external hydraulic implement is fluidly connected between ports 62 and 63.

Figure 14:
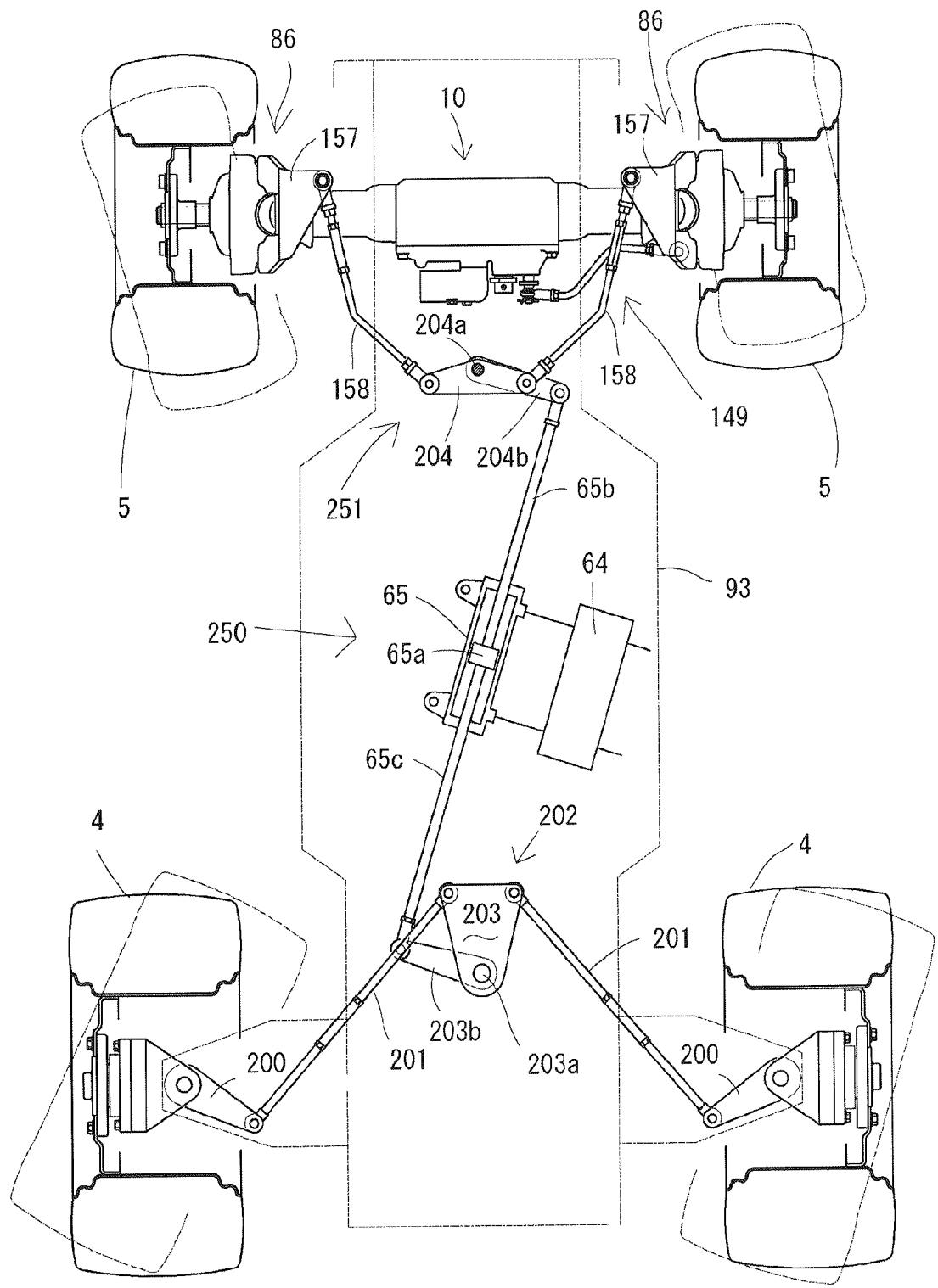
FIG. 14 is a schematic plan view of an alternative working vehicle equipped with the hydrostatic transaxle according to the invention.

FIG. 14 illustrates a four-wheel drive and four-wheel steering working vehicle 250 provided with a hydraulic steering operation mechanism 251 to which both steering linkage 149 from front transaxle 10 and a steering linkage 202 from rear transaxle 9 are operatively connected. In this regard, in vehicle 250, rear wheels 4 are steerably attached to respective axles 94 of rear transaxle 9 through respective universal joints (not shown), so that rear wheels 4 drivingly connected to hydraulic motor 22 are steerably supported by vehicle frame 93 centered on respective substantially vertical lines.

Figure 15:
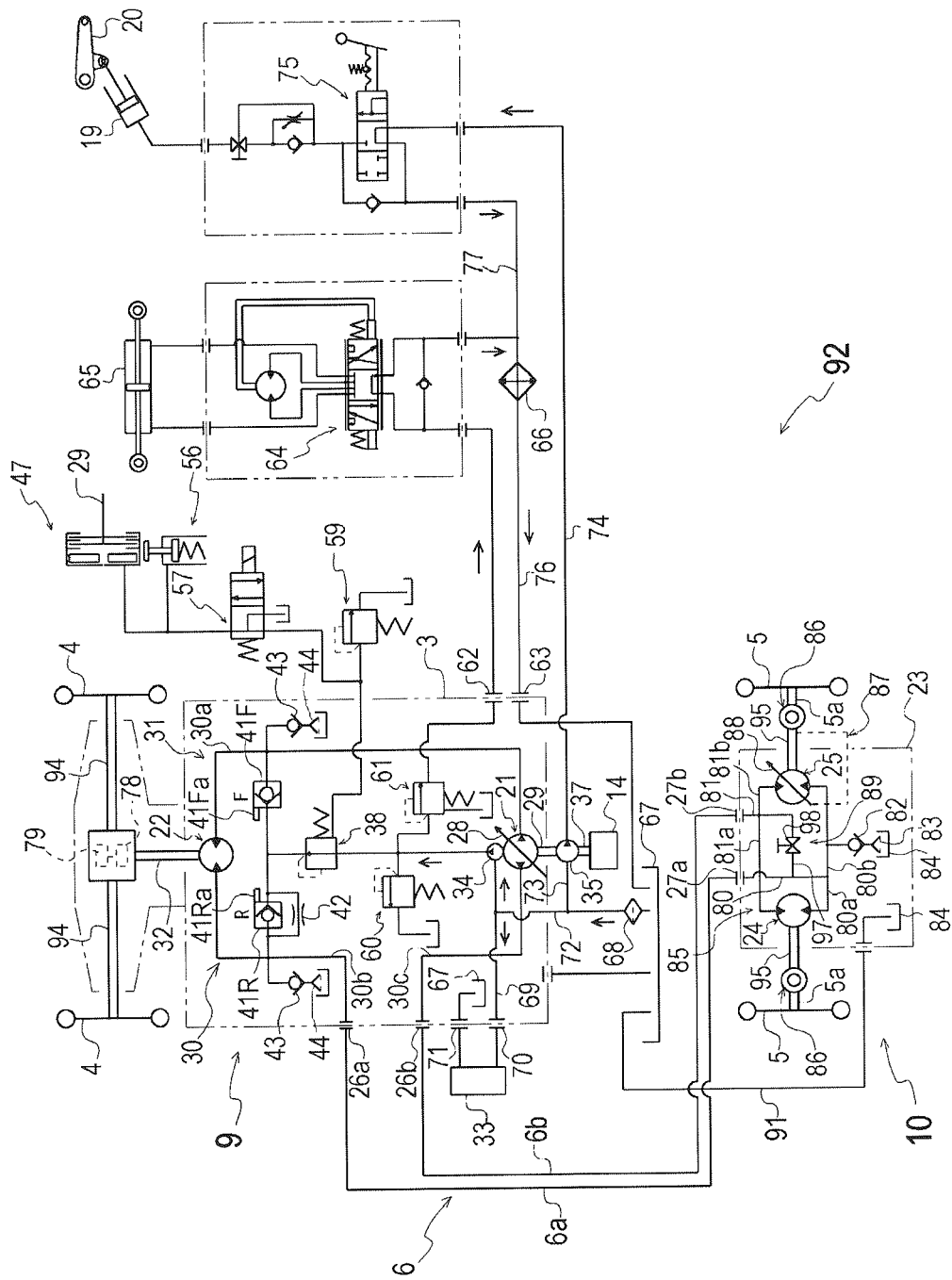
FIG. 15 is a hydraulic circuit diagram of the working vehicle of FIG. 14.

As shown in FIGS. 14 and 15, steering operation mechanism 251 includes a double-acting hydraulic power steering cylinder 65 and a steering control valve 64 for controlling a piston 65a in power steering cylinder 65. Steering control valve 64 is operatively connected to steering wheel 8 through steering wheel shaft 153 (see FIGS. 1 and 12). Power steering cylinder 65 and power control valve 64 are supplied with fluid from fluid extraction port 62 of rear transaxle 9. Fluid drained from steering control valve 64 is joined to the fluid drained from lift control valve 75 so as to be returned to fluid sump 67 (preferably in casing 3) through fluid cooler 66, fluid passage 76 and fluid returning port 63.

Steering operation mechanism 251 further includes a front steering rotary plate 204 and a rear steering rotary plate 203. Front steering rotary plate 204, which is triangular when viewed in plan, is horizontally rotatably pivoted at a laterally middle front end portion thereof through a vertical pivot shaft 204a, which may be pivoted similarly to pivot shaft 155a of sector gear 155. The above-mentioned left and right connection rods 158 of steering linkage 149 are pivoted at the respective rear ends thereof onto left and right end portions of front steering rotary plate 204 essentially rearward from pivot shaft 204a. An arm 204b is also pivoted through pivot shaft 204a rotatably integrally with front steering rotary plate 204, and is pivotally connected to a piston rod 65b extended forward from piston 65a in power steering cylinder 65.

Rear steering rotary plate 203, which is triangular when viewed in plan, is horizontally rotatably pivoted at a laterally middle rear end portion thereof through a vertical pivot shaft 203a. Left and right front corners of rear steering rotary plate 203 onto which later-discussed connection rods 201 are pivoted are essentially disposed forward from pivot shaft 203*a*. An arm 203*b* is also pivoted through pivot shaft 203*a* rotatably integrally with front steering rotary plate 203, and is pivotally connected to a piston rod 65*c* extended rearward from piston 65*a* in power steering cylinder 65 coaxially and oppositely to piston rod 65*b*.

In the lateral direction of vehicle 250, the extension direction of arm 204*b* from pivot shaft 204*a* is opposite to the extension direction of arm 203*b* from pivot shaft 203*a* so as to ensure that, when steering wheel 8 is rotated leftward or rightward, front wheels 5 are turned in the same lateral direction with the rotation direction of steering wheel 8, and simultaneously, rear wheels 4 are turned laterally opposite to front wheels 5, i.e., opposite to the rotation direction of steering wheel 8.

Steering linkage 202 for rear wheels 4 includes a pair of left and right steering arms 200 and a pair of left and right connection rods 201. Left and right steering arms 200 are provided onto respective rear wheels 4 steerably integrally with respective rear wheels 4. Connection rods 201 are pivoted at rear ends thereof on tips of respective steering arms 200, and are extended laterally proximally forward so as to be pivoted at front ends thereof onto the respective left and right front corners of rear steering rotary plate 203. In other words, connection rods 201 are arranged in a V-shape when viewed in plan so as to be connected to rear steering rotary plate 203 serving as a common rotary member of steering operation mechanism 251. Preferably, each of connection rods 201 is provided at an axial intermediate portion thereof with a telescopically movable member for adjusting the length of connection rod 201.

The hydrostatic transaxle of the present invention, serving as front transaxle 10 or 172, is adaptable to various working vehicles in addition to the illustrated mower tractor. Further, illustrated working vehicles 1 and 162 employ the Ackerman type steering system. Alternatively, the hydrostatic transaxle is adaptable to a working vehicle having a different type steering system, such as an articulated working vehicle, which may have a different peripheral speed setting of front and rear wheels or a different arrangement of a hydraulic pump, such as a hydraulic pump unit disposed separately from front and rear transaxles.

The foregoing description is given to preferred embodiments of the disclosed apparatus and various changes and modifications about combination and arrangement of components, for example, may be made in the invention without departing from the scope thereof defined by the following claims.

What is claimed is:

1. A vehicle comprising:
   a front transaxle including a variable displacement hydraulic motor;
   a pair of right and left steerable members connected to respective right and left ends of the front transaxle via a pair of respective king pins, and connected to each other so as to be rotatable integrally with each other and relative to the front transaxle;
   a pair of right and left front wheels supported by the respective right and left steerable members and drivingly connected to the hydraulic motor;
   a pair of right and left steerable rear wheels;
   a steering operation device;
   a cylinder telescopically controlled by operation of the steering operation device, and operatively connected to the pair of steerable members and the pair of rear wheels, wherein a telescopic action of the cylinder by operation of the steering operation device moves the pair of steerable members and the pair of rear wheels;
   a connection member pivoted on a vehicle body via a pivot, having right and left ends forward from the pivot, and having an arm extended rightward or leftward from the pivot;
   a pair of right and left rods extended forward from the respective right and left rear wheels so as to be connected at respective front ends thereof to the respective right and left ends of the connection member; and
   a link extended forward from the arm of the connection member so as to transmit the telescopic action of the cylinder to the connection member.

2. The vehicle according to claim 1, wherein the pair of steerable members and the pair of rear wheels are moved according to the telescopic action of the cylinder by operation of the steering operation device so that the pair of front wheels turn in one of right and left directions of the vehicle, and the pair of rear wheels turn in the other of right and left directions of the vehicle.

* * * * *